(12) United States Patent
Oshidari

(10) Patent No.: US 7,282,008 B2
(45) Date of Patent: Oct. 16, 2007

(54) MODE SWITCH CONTROL SYSTEM FOR HYBRID TRANSMISSION

(75) Inventor: Toshikazu Oshidari, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 429 days.

(21) Appl. No.: 11/055,118

(22) Filed: Feb. 11, 2005

(65) Prior Publication Data

US 2005/0178593 A1    Aug. 18, 2005

(30) Foreign Application Priority Data

Feb. 13, 2004    (JP) ............................. 2004-036079

(51) Int. Cl.
*B60W 10/08* (2006.01)
(52) U.S. Cl. ............................................. 477/4; 477/3
(58) Field of Classification Search .................. 477/3, 477/4, 5, 6
See application file for complete search history.

(56) References Cited

U.S. PATENT DOCUMENTS

| 5,931,757 A | 8/1999 | Schmidt |
| 6,018,198 A * | 1/2000 | Tsuzuki et al. ............... 290/17 |
| 7,093,512 B2 * | 8/2006 | Ibamoto et al. ............... 74/339 |
| 7,207,919 B2 * | 4/2007 | Tsuneyoshi et al. ........... 477/5 |

FOREIGN PATENT DOCUMENTS

| JP | 2000-62483 A | | 2/2000 |
| JP | 2006183682 A | * | 7/2006 |

OTHER PUBLICATIONS

U.S. Appl. No. 11/004,875, filed Dec. 7, 2004, Oshidari.

* cited by examiner

*Primary Examiner*—Ha D. Ho
(74) *Attorney, Agent, or Firm*—Foley & Lardner LLP

(57) ABSTRACT

A mode switch control system for a hybrid transmission for a powertrain, the powertrain including an engine, a first motor/generator, and a second motor/generator, which controls a mode switch from a high speed mode to a low speed mode. The high speed mode is established by engaging a high-mode clutch. The low speed mode is established by engaging a low-mode brake. In the mode switch, the mode switch control system reduces the torque capacity of the high-mode clutch to zero linearly in time by an open-loop control system, and varies the torque of the second motor/generator to a target torque by a feedback control system so as to adjust the gear ratio to a target gear ratio, while the mode switch control system holds substantially constant the input torque from the engine, and the torque of the first motor/generator, to hold substantially constant the output torque.

15 Claims, 14 Drawing Sheets

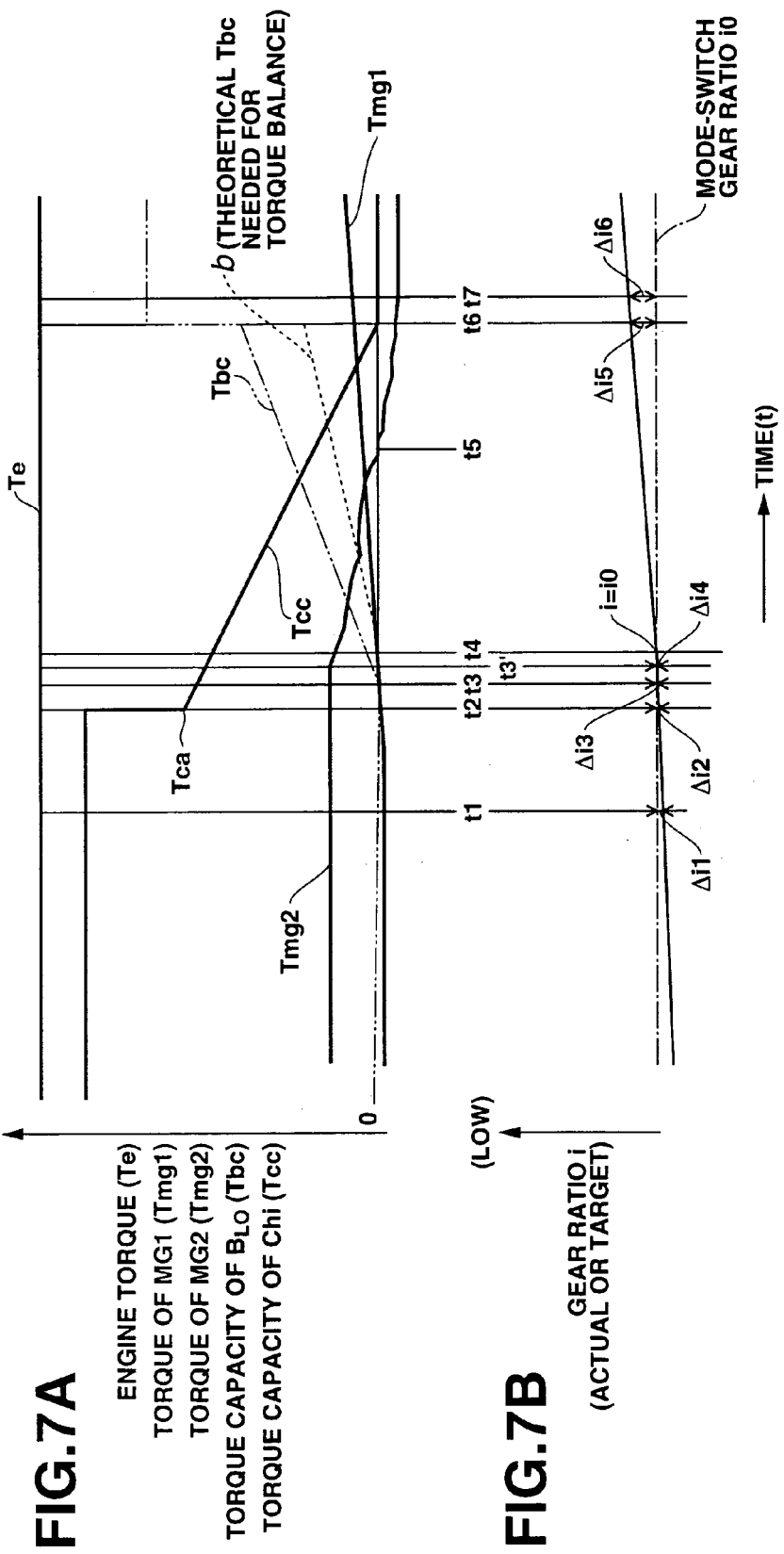

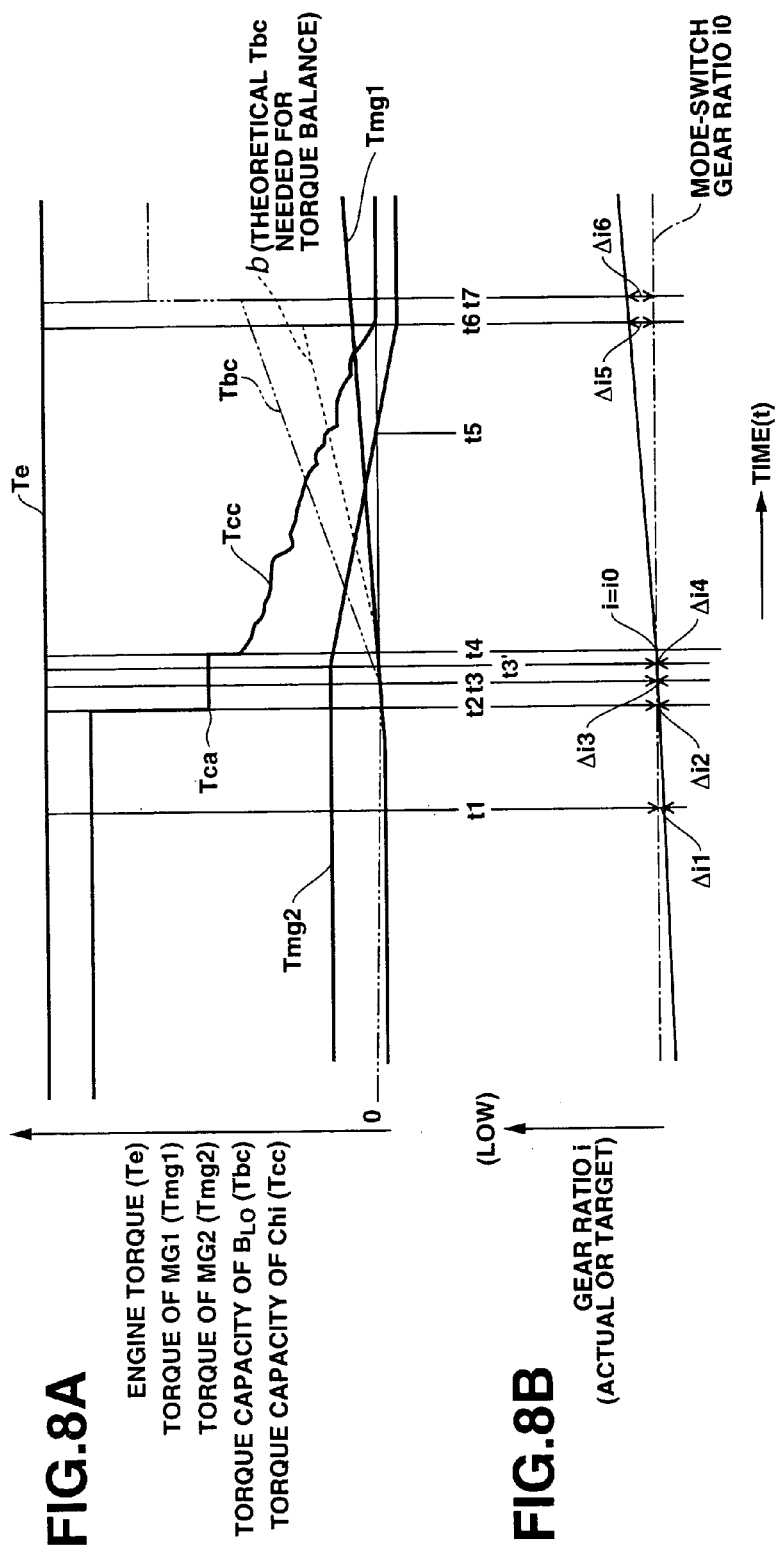

MODE SWITCH CONTROL SYSTEM FOR HYBRID TRANSMISSION

BACKGROUND OF THE INVENTION

The present invention relates generally to mode switch control systems for hybrid transmissions operable in a plurality of transmission modes, and more particularly to a mode switch control system for a hybrid transmission operable in a high speed mode for infinitely variable high speed ratios and in a low speed mode for infinitely variable low speed ratios, which is configured to smoothly switch the transmission mode from the high speed mode to the low speed mode so as not to cause an undue change in the transmission output torque and a discontinuity in a change in the transmission gear ratio.

In recent years, there have been disclosed various hybrid transmissions. One such hybrid transmission includes a differential unit interconnecting an engine, an output shaft, and motor/generators. The differential unit includes a plurality of rotating elements, three or more of which are each configured to be connected to an associated one of the engine, the output shaft, and the motor/generators. The hybrid transmission includes torque-transmitting mechanisms such as a clutch and a brake, which are selectively engageable to connect two associated ones of the rotating elements, to establish a high speed mode suitable for infinitely variable high speed ratios, or to establish a low speed mode suitable for infinitely variable low speed ratios. A Published Japanese Patent Application No. 2000-62483 shows such a hybrid transmission with a high speed mode and a low speed mode as discussed above. However, there has been disclosed no substantial appropriate process of the mode switch operation between the high speed mode and the low speed mode of the hybrid transmission. Accordingly, it is a general method of switching the transmission mode of a hybrid transmission to instantaneously switch engagement states of associated selectively engageable torque-transmitting mechanisms between an engaged condition and a disengaged condition, at a time point when the operating state of the hybrid transmission is in an intermediate one between the high speed mode and the low speed mode.

SUMMARY OF THE INVENTION

In general, a mode switch causes a change in torque balance in a hybrid transmission. In some of the transmissions, near a switching point between a high speed mode and a low speed mode, a first torque of one of the motor/generators which is desired in the high speed mode is different from a second torque which is desired in the low speed mode, while the engine torque and the transmission output torque held substantially constant. In case the first and second torques have opposite directions, there is a polarity reversal in the associated motor/generator. In a process of the mode switch with a polarity reversal of a motor/generator, an instantaneous mode switch operation is not preferable. When a torque-transmitting mechanism for establishing the low speed mode is instantaneously disengaged during the process including the polarity reversal of the motor/generator torque, the polarity reversal of the motor/generator torque causes an undue change in the transmission output torque and a discontinuity in the gear ratio. This results in lowering the quality of the mode switch operation of the hybrid transmission.

Accordingly, it is an object of the present invention to provide a mode switch control system for a hybrid transmission operable in a high speed mode for infinitely variable high speed ratios and in a low speed mode for infinitely variable low speed ratios, which is configured to smoothly switch the transmission mode from the high speed mode to the low speed mode so as not to cause an undue change in the transmission output torque and a discontinuity in a change in the transmission gear ratio.

According to one aspect of the present invention, a mode switch control system for a hybrid transmission for a powertrain, the powertrain including an engine, a motor/generator, and an output shaft, the hybrid transmission including a stationary rotating element, and a differential unit including a plurality of rotating elements to connect the engine, the motor/generator, and the output shaft to each other, comprises a first torque-transmitting mechanism selectively engageable to connect specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable to disconnect the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio; an actuator to adjust a torque capacity of the first torque-transmitting mechanism; a motor/generator controller to adjust a torque of the motor/generator; and a control unit in operative communication with the actuator and the motor/generator controller, to perform the following: determining an operating condition of the hybrid transmission; issuing a command indicative of switching the transmission mode from the high speed mode to the low speed mode, in accordance with the operating condition of the hybrid transmission; and performing the following, in response to the command: reducing the torque capacity of the first torque-transmitting mechanism, to disengage the first torque-transmitting mechanism; and varying the torque of the motor/generator to the second torque, in connection with the reduction of the torque capacity of the first torque-transmitting mechanism.

According to another aspect of the invention, a mode switch control system for a hybrid transmission for a powertrain, the powertrain including an engine, a motor/generator, and an output shaft, the hybrid transmission including a stationary rotating element, and a differential unit including a plurality of rotating elements to connect the engine, the motor/generator, and the output shaft to each other, comprises first torque-transmitting means selectively engageable for connecting specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable for disconnecting the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio; actuating means for adjusting a torque capacity of the first torque-transmitting means; motor/generator controlling means for adjusting a torque of the motor/generator; and control means in operative communication with the actuating means and the motor/generator controlling means, for performing the following: determining an operating condition of the hybrid transmission; issuing a command indicative of switching the transmission mode from the high speed mode to the low speed mode, in accordance with the operating condition of the hybrid transmission; and performing the following, in response to the command: reducing the torque capacity of the first torque-transmitting means, to disengage the first torque-transmitting means; and varying the torque of the motor/generator to the second torque, in connection with the reduction of the torque capacity of the first torque-transmitting means.

According to a further aspect of the invention, a method of controlling a hybrid transmission for a powertrain, the powertrain including an engine, a motor/generator, and an output shaft, the hybrid transmission including a stationary rotating element, a differential unit including a plurality of rotating elements to connect the engine, the motor/generator, and the output shaft to each other, and a first torque-transmitting mechanism selectively engageable to connect specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable to disconnect the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio, the method comprises determining an operating condition of the hybrid transmission, issuing a command indicative of switching the transmission mode from the high speed mode to the low speed mode, in accordance with the operating condition of the hybrid transmission, and performing the following, in response to the command, reducing the torque capacity of the first torque-transmitting mechanism, to disengage the first torque-transmitting mechanism, and varying the torque of the motor/generator to the second torque, in connection with the reduction of the torque capacity of the first torque-transmitting mechanism.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIGS. 7A and 7B are time charts depicting a process of controlling the mode switch from the high speed mode to the low speed mode, in accordance with another embodiment of the present invention.

FIGS. 8A and 8B are time charts depicting a process of controlling a mode switch from the high speed mode to the low speed mode, in accordance with another embodiment of the present invention.

DETAILED DESCRIPTION OF THE INVENTION

Figure 1:
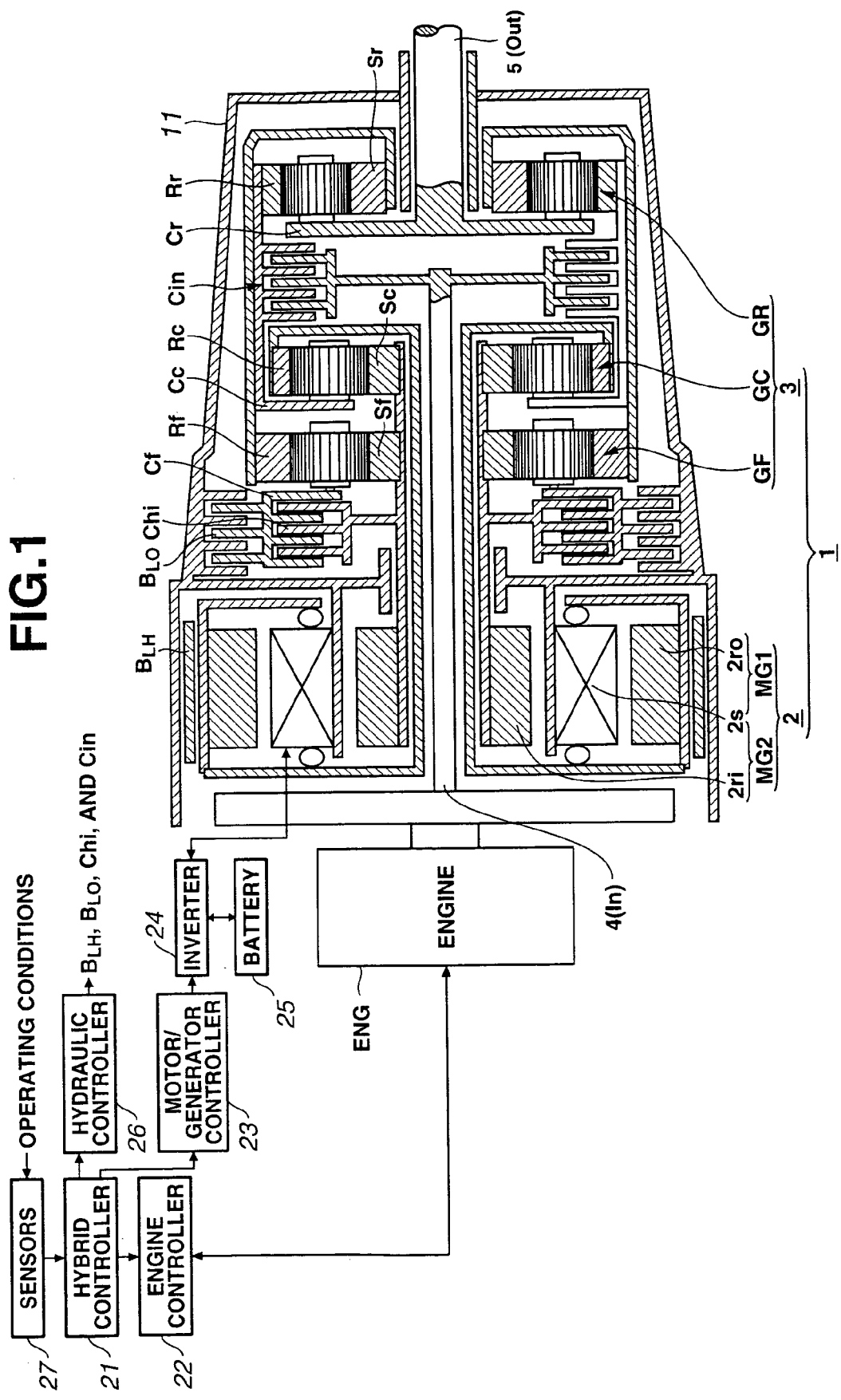
FIG. 1 is a schematic diagram depicting a hybrid transmission and a mode switch control system for the hybrid transmission in accordance with an embodiment of the present invention.

FIG. 1 is a schematic diagram depicting a hybrid transmission and a mode switch control system for the hybrid transmission in accordance with an embodiment of the present invention. Hybrid transmission 1 is configured to be mounted on automotive vehicles, especially suitable for a front engine, rear drive, vehicle. As shown in FIG. 1, hybrid transmission 1 includes a transmission housing 11 as a stationary rotating element formed into a tubular shape. Transmission housing 11 houses three planetary gearsets in a rear section located far from an engine ENG in the axial direction (on the right side in the horizontal direction in FIG. 1). More specifically, a front planetary gearset GF is mounted nearer to engine ENG. A rear planetary gearset GR is mounted farer from engine ENG. Between front planetary gearset GF and rear planetary gearset GR is disposed a central planetary gearset GC. All these planetary gearsets are mounted coaxially with transmission housing 11. In a front section of transmission housing 11 which is nearer to engine ENG (on the left side in FIG. 1), a pair of motor/generators such as a compound-current double-layer motor 12 is mounted coaxially with planetary gearsets GF, GC, and GR, or with transmission housing 11.

Front planetary gearset GF, central planetary gearset GC, and rear planetary gearset GR are combined to provide a differential unit 3 with three degrees of freedom, as follows. Front planetary gearset GF is a simple planetary gear including three major rotating elements of a front sun gear Sf, a front ring gear Rf, and a front planet-pinion carrier Cf. Central planetary gearset GC is a simple planetary gear including three major rotating elements of a central sun gear Sc, a central ring gear Rc, and a central planet-pinion carrier Cc. Rear planetary gearset GR is a simple planetary gear including three major rotating elements of a rear sun gear Sr, a rear ring gear Rr, and a rear planet-pinion carrier Cr. Rear ring gear Rr and central planet-pinion carrier Cc are rigidly coupled to each other. This coupled members are connected to an input shaft 4 via an engine clutch Cin. Rotation of engine ENG is input to input shaft 4. Engine clutch Cin is selectively engageable to connect the coupled members and input shaft 4. Rear planet-pinion carrier Cr is coupled to an output shaft 5. In lever diagrams as discussed below, input shaft 4 and output shaft 5 are indicated by "In" and "Out", respectively.

Compound-current double-layer motor 2 includes a pair of rotors including an inner rotor 2ri and an outer rotor 2ro of an annular shape surrounding inner rotor 2ri each coaxially and rotatably supported on a front section of transmission housing 11, and a stator 2s fixed with reference to transmission housing 11 and disposed in an annular space defined between inner rotor 2ri and outer rotor 2ro. Thus, stator 2s and outer rotor 2ro serve for a first motor/generator MG1, and stator 2s and inner rotor 2ri serve for a second motor/generator MG2. Motor/generators MG1, MG2 each function as a motor that during a compound current being supplied, outputs a rotational speed (including zero) in a direction in accordance with the supplied current, or each function as a generator that during an external torque being applied, outputs a power in accordance with a rotational speed by the external torque.

First motor/generator MG1 (or outer rotor 2ro) is connected to central ring gear Rc. Second motor/generator MG2 (or inner rotor 2ri) is connected to front sun gear Sf. Front sun gear Sf is rigidly coupled to central sun gear Sc. Front planet-pinion carrier Cf and front sun gear Sf are connected via a selectively engageable high-mode clutch Chi as a first torque-transmitting mechanism. High-mode clutch Chi is selectively engageable to connect front planet-pinion carrier Cf and front sun gear Sf to establish the high speed mode to set the speed ratio of the output speed to output shaft 5 to the input speed from engine ENG to an infinitely variable high speed ratio, and disengageable to disconnect front planet-pinion carrier Cf and front sun gear Sf to establish the low speed mode to set the speed ratio to an infinitely variable low speed ratio. Front planet-pinion carrier Cf is selectively held stationary against rotation by a selectively engageable low-mode brake $B_{LO}$ as a second torque-transmitting mechanism. Low-mode brake $B_{LO}$ is selectively engageable to connect front planet-pinion carrier Cf and transmission housing 11 to set the speed ratio to an infinitely variable low speed ratio, and disengageable to disconnect front planet-pinion carrier Cf and transmission housing 11 to set the speed ratio to an infinitely variable high speed ratio. Front ring gear Rf is rigidly coupled to rear sun gear Sr.

Outside outer rotor 2ro is provided a band brake such as a selectively engageable low/high-mode brake $B_{LH}$. Low/high-mode brake $B_{LH}$ is operable to selectively hold against rotation outer rotor 2ro, so as to hold against rotation central ring gear Rc connected to outer rotor 2ro. With selectively engageable torque-transmitting mechanisms disengaged, differential unit 3 has three degrees of freedom. As discussed below, at least one of low-mode brake $B_{LO}$, high-mode clutch Chi, and low/high-mode brake $B_{LH}$ is engaged in any transmission mode, so that differential unit 3 has two or less degrees of freedom. Accordingly, with two of the rotational speeds of the rotating elements of differential unit 3 determined, all the rotational speeds of the rotating elements of differential unit 3 are determined.

The following describes the configuration of the mode switch control system. As shown in FIG. 1, the control system includes a hybrid controller 21 as a main control unit to integrally control engine ENG and hybrid transmission 1 (including motor/generators MG1, MG2). More specifically, hybrid controller 21 issues a command to an engine controller 22 to adjust output torque Te of engine ENG to a target torque. Hybrid controller 21 also issues commands to a motor/generator controller 23 to adjust output torques Tm1, Tm2 of motor/generators MG1, MG2 to target torques. Motor/generator controller 23 controls motor/generators MG1, MG2 via an inverter 24 and via a battery 25 to adjust output torques Tm1, Tm2 to target torques. In addition, hybrid controller 21 issues commands to a hydraulic controller 26 including an actuator to operate selectively engageable torque-transmitting mechanisms of low/high-mode brake $B_{LH}$, low-mode brake $B_{LO}$, high-mode clutch Chi, and engine clutch Cin. Hydraulic controller 26 adjusts the torque capacities of the torque-transmitting mechanisms. In other words, hydraulic controller 26 adjusts the slippage ratio of the torque-transmitting mechanisms. On the other hand, hybrid controller 21 receives information needed to determine the control method from sensors 27 as a sensing section. Sensors 27 measure operating conditions such as rotational speeds of the rotating elements, accelerator opening, and a vehicle speed.

FIGS. 2 through 5 show lever diagrams in accordance with operating states of hybrid transmission 1 of FIG. 1. A lever indicated by GF in the lever diagrams represents an operating state of front planetary gearset GF, in which the rotational speed varies monotonously in order of first sun gear Sf, first planet-pinion carrier Cf, and first ring gear Rf. In other words, first sun gear Sf, first planet-pinion carrier Cf, and first ring gear Rf have an extreme rotational speed, an intermediate rotational speed, and another extreme rotational speed, among the three rotating elements of front planetary gearset GF, respectively. A lever GC represents an operating state of central planetary gearset GC, in which the rotational speed varies monotonously in order of central ring gear Rc, central planet-pinion carrier Cc, and central sun gear Sc. In other words, central ring gear Rc, central planet-pinion carrier Cc, and central sun gear Sc have an extreme rotational speed, an intermediate rotational speed, and another extreme rotational speed, among the three rotating elements of central planetary gearset GC, respectively. A lever GR represents an operating state of rear planetary gearset GR, in which the rotational speed varies monotonously in order of rear ring gear Rr, rear planet-pinion carrier Cr, and second sun gear Sr. In other words, rear ring gear Rr, rear planet-pinion carrier Cr, and second sun gear Sr have an extreme rotational speed, an intermediate rotational speed, and another extreme rotational speed, among the three rotating elements of rear planetary gearset GR, respectively. The left end point of lever GR, or rear ring gear Rr, and the central point of central planetary gearset GC, or central planet-pinion carrier Cc, are connected to each other. At this connected point, the rotation of engine ENG is input via engine clutch Cin (input In). Rear sun gear Sr at the right point of lever GR is connected to front ring gear Rf at the right point of lever GF. Central sun gear Sc at the right point of lever GC is connected to front sun gear Sf at the left point of lever GF.

Low-mode brake $B_{LO}$ is operable to selectively hold against rotation front planet-pinion carrier Cf at the central point of lever GF. High-mode clutch Chi is engageable to selectively connect front sun gear Sf at the left point, and front planet-pinion carrier Cf at the central point, of lever GF. Central ring gear Rc at the left point of lever GC is connected to first motor/generator MG1. Central sun gear Sc at the right point of lever GC is connected to second motor/generator MG2. Rear planet-pinion carrier Cr at the central point of lever GR is connected to output shaft 5 (output Out to the driven wheels (not shown)). Low/high-mode brake $B_{LH}$ is operable to selectively hold against rotation central ring gear Rc at the left point of lever GC.

The lever diagrams as shown in FIGS. 2 through 5 represent operating states of hybrid transmission 1. Relative distances between the rotating elements along the horizontal axis of the lever diagram are determined by gear ratios between the rotating elements of hybrid transmission 1. In central planetary gearset GC and rear planetary gearset GR, with the distance between rear ring gear Rr and rear planet-pinion carrier Cr set to 1 as a reference, the distance between central ring gear Rc and central planet-pinion carrier Cc is $\alpha$, and the distance between rear planet-pinion carrier Cr and rear sun gear Sr is $\beta$. In front planetary gearset GF, with the distance between front sun gear Sf and front planet-pinion carrier Cf set to 1 as a reference, the distance between front planet-pinion carrier Cf and front ring gear Rf is $\delta$. Positions along the vertical axis of the lever diagram indicate rotational speeds of the rotating elements. A positive position above zero indicates a forward (normal) rotation, while a negative position below zero indicates a backward (reverse) rotation.

Figure 2:
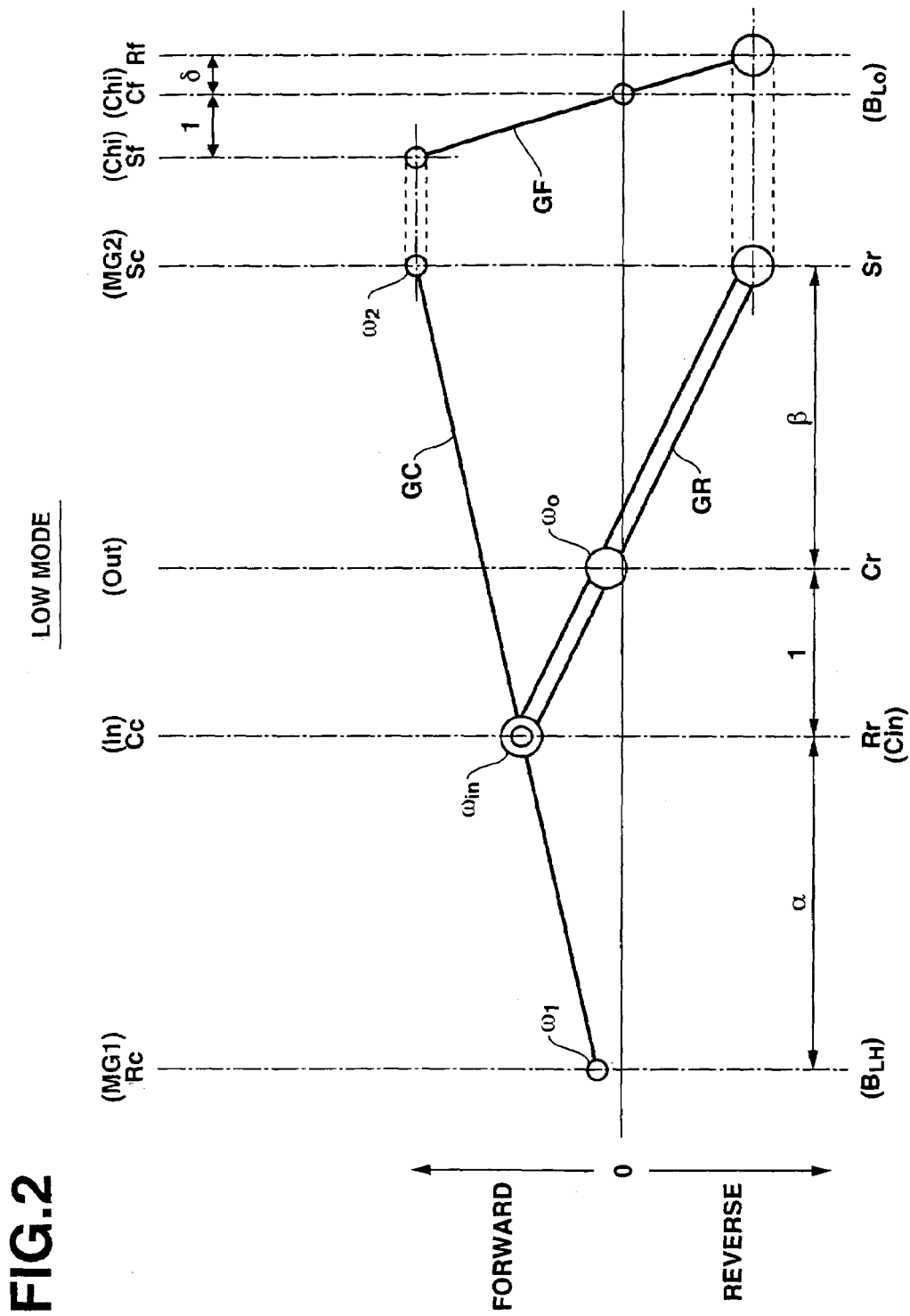
FIG. 2 is a lever diagram depicting an operating state of the hybrid transmission of FIG. 1 in a low speed mode.

FIG. 2 shows a low speed mode of hybrid transmission 1. In the low speed mode, low-mode brake $B_{LO}$ is engaged to hold against rotation front planet-pinion carrier Cf at the central point of lever GF. With the rotational speed of front planet-pinion carrier Cf being zero, rear sun gear Sr (and front ring gear Rf) rotates reversely at a rotational speed determined by the gear ratio of front sun gear Sf to front ring gear Rf with respect to central sun gear Sc (and front sun gear Sf). Accordingly, as seen in FIG. 2, output speed $\omega_o$ of output Out connected to rear planet-pinion carrier Cr at the central point of lever GR is lower than input speed $\omega_{in}$ of input In connected to rear ring gear Rr (central planet-pinion carrier Cc) at the left point of lever GR, that is, than the engine speed input via engine clutch Cin. The low speed mode is employed for a gear ratio range from a gear ratio at which the rotational speed of central sun gear Sc and front sun gear Sf is zero to infinity in the forward speed range. The unique gear ratio as a boundary point between the high speed mode and the low speed mode is equal to $(1+1/\beta)$. The low speed mode is also employed for the reverse speed range.

With input speed $\omega_{in}$ fixed to a constant speed, the magnitude of the rotational speed of rear sun gear Sr increases with positively increasing rotational speed of central sun gear Sc. With increasing magnitude of the rotational speed of rear sun gear Sr, output speed $\omega_o$ decreases. Accordingly, the gear ratio increases higher (to lower speed ratios), then to infinity (output speed $\omega_o$ being zero), and further to a range of reverse gear ratios, with increasing rotational speed of central sun gear Sc.

In the low speed mode, with low-mode brake $B_{LO}$ engaged, hybrid transmission 1 is operated to establish infinitely variable gear ratio with two degrees of freedom. More specifically, in the low speed mode, hybrid controller 21 controls first motor/generator MG1, second motor/generator MG2, and engine ENG, to establish an arbitrary gear ratio of input speed $\omega_{in}$ to output speed $\omega_o$.

Alternatively, in the low speed mode, low/high-mode brake $B_{LH}$ may be further engaged to hold against rotation central ring gear Rc, so that the gear ratio is fixed to a gear ratio $(=(1+1/\beta))$. In this fixed gear ratio, the torque of engine ENG and the torque of second motor/generator MG2 are combined to produce a large driving torque, so that the vehicle can travel by a large torque at a low speed. Second motor/generator MG2 may be operated as a generator in this mode, canceling a part of the torque input from engine ENG, so as to produce a reduced driving torque and at the same time to charge battery 25. Thus, with low-mode brake $B_{LO}$ engaged and low/high-mode brake $B_{LH}$ engaged, hybrid transmission 1 is operated to establish a fixed gear ratio with one degree of freedom. More specifically, in this fixed low speed mode, hybrid controller 21 controls second motor/generator MG2, and engine ENG, to establish the fixed gear ratio of input speed $\omega_{in}$ to output speed $\omega_o$.

Figure 3:
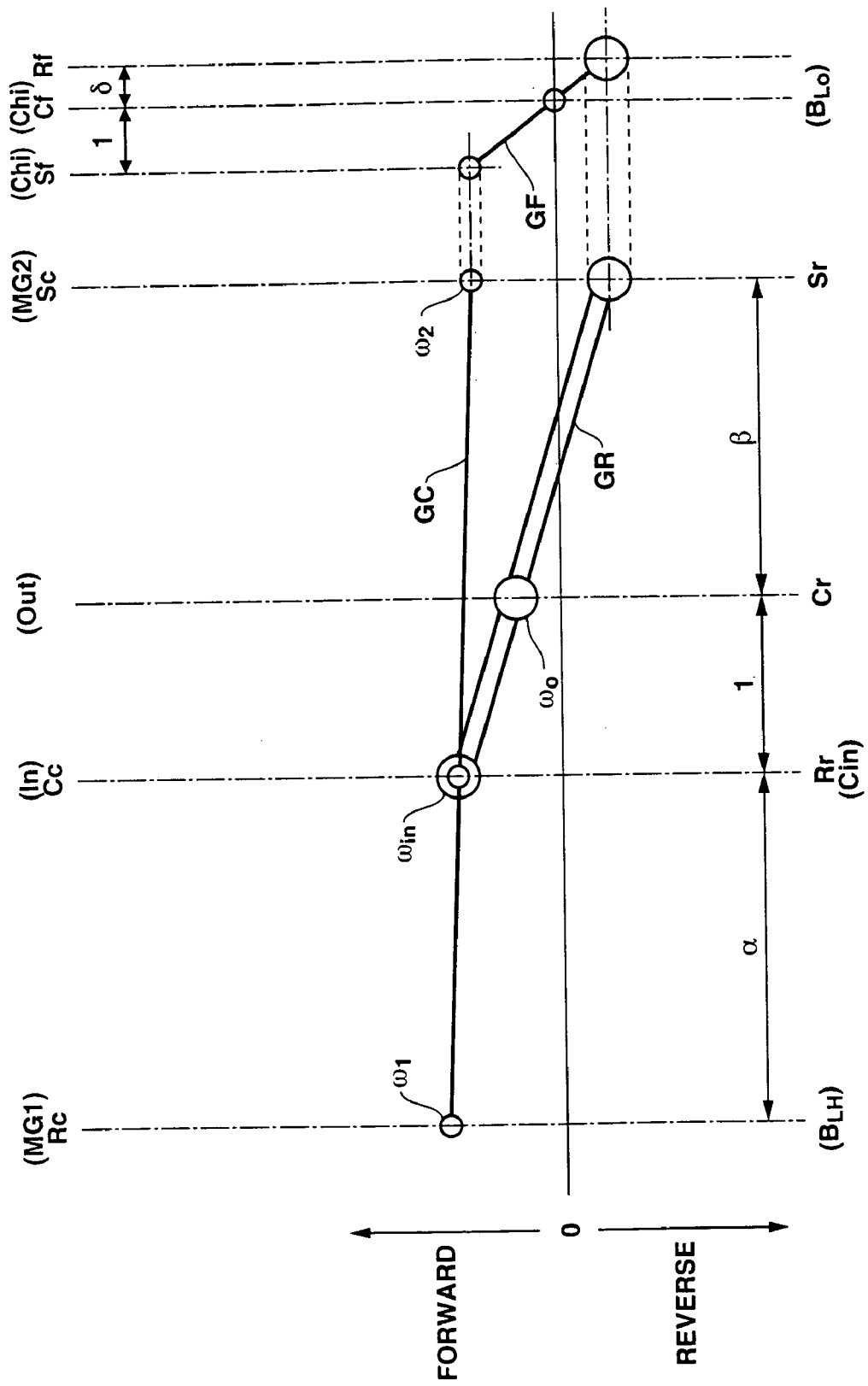
FIG. 3 is a lever diagram depicting an operating state of the hybrid transmission of FIG. 1 in a transition process between the low speed mode and a 2nd mode.
Figure 4:
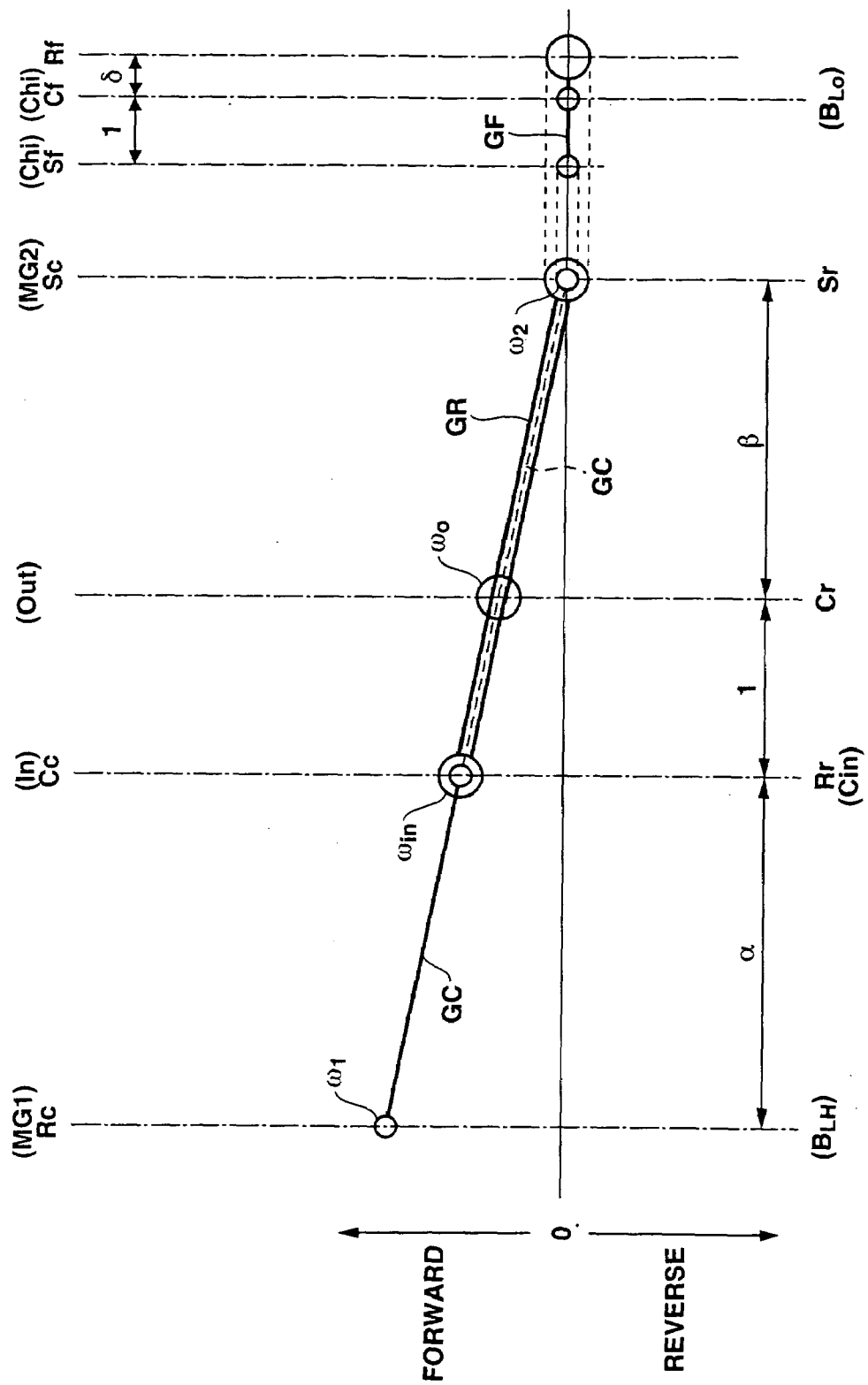
FIG. 4 is a lever diagram depicting an operating state of the hybrid transmission of FIG. 1 in the 2nd mode.

FIG. 4 shows a 2nd mode of hybrid transmission 1. The transmission mode is shifted from the low speed mode to the 2nd mode by engaging high-mode clutch Chi to connect front sun gear Sf and front planet-pinion carrier Cf. FIG. 3 shows an operating state of transition of the transmission mode from the low speed mode to the 2nd mode, in which the magnitudes of the rotational speeds of central sun gear Sc (and front sun gear Sf) and front ring gear Rf (and rear sun gear Sr) are decreasing toward zero with decreasing slippage in high-mode clutch Chi. With high-mode clutch Chi completely engaged, the 2nd mode is established as shown in FIG. 4.

As shown in FIG. 4, in the 2nd mode, the rotational speeds of rear sun gear Sr and central sun gear Sc are zero. Accordingly, lever GR and lever GC overlap one another with the right points fixed to zero point, so that hybrid transmission 1 has one degree of freedom. Thus, the gear ratio is fixed at a gear ratio. In the fixed gear ratio, the vehicle travels by the driving torque which is generated by engine ENG and/or first motor/generator MG1. In the second mode, with low-mode brake $B_{LO}$ engaged and high-mode clutch Chi engaged, hybrid transmission 1 is operated to establish a fixed gear ratio with one degree of freedom. More specifically, in this 2nd mode, hybrid controller 21 controls first motor/generator MG1, and engine ENG, to establish the fixed gear ratio of input speed $\omega_{in}$ to output speed $\omega_o$.

Figure 5:
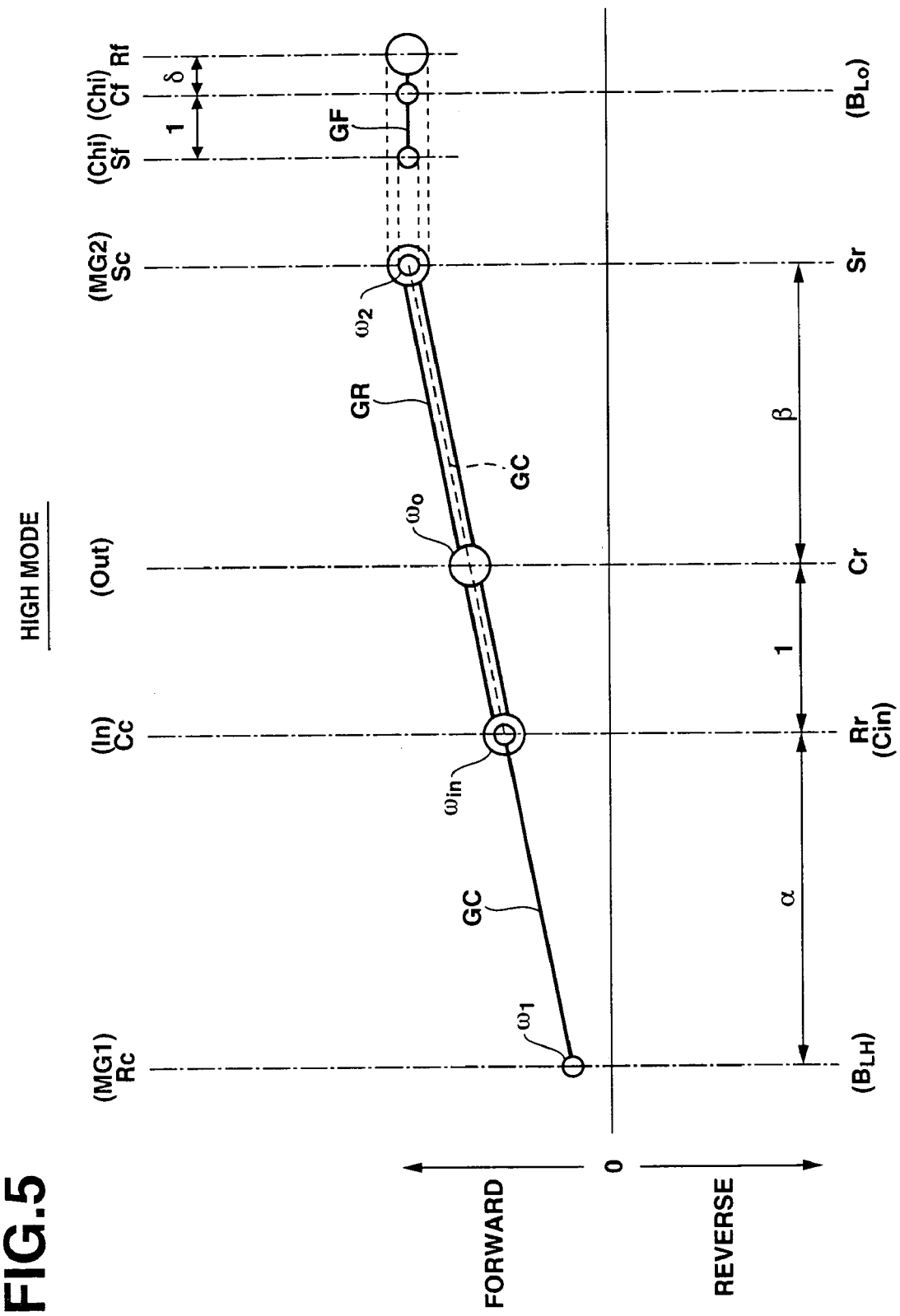
FIG. 5 is a lever diagram depicting an operating state of the hybrid transmission of FIG. 1 in a high speed mode.

FIG. 5 shows a high speed mode of hybrid transmission 1. In the high speed mode, high-mode clutch Chi is engaged to connect front planet-pinion carrier Cf and front sun gear Sf. With low-mode brake $B_{LO}$ disengaged, the three rotating elements of front planetary gearset GF rotate integrally at a same rotational speed. As shown in FIG. 5, lever GF moves up and down, held in the horizontal position. Lever GR and lever GC overlap each other, to be a single lever including four rotating elements with two degrees of freedom.

In the high speed mode, with high-mode clutch Chi engaged, hybrid transmission 1 is controlled with two degrees of freedom, to establish an infinitely variable gear ratio. More specifically, in the high speed mode, hybrid controller 21 controls first motor/generator MG1, second motor/generator MG2, and engine ENG, with two degrees of freedom, to provide an arbitrary gear ratio of input speed $\omega_{in}$ to output speed $\omega_o$, and an arbitrary output torque. As seen in FIG. 5, in the high speed mode, output speed $\omega_o$ of output Out connected to rear planet-pinion carrier Cr at the central point of lever GR is higher than input speed $\omega_{in}$ of input In connected to rear ring gear Rr (central planet-pinion carrier Cc) at the left point of lever GR, that is, than the engine speed input via engine clutch Cin. This high speed mode is employed, when an infinitely variable high speed ratio is desired.

Alternatively, in the high speed mode, low/high-mode brake $B_{LH}$ may be engaged to hold against rotation central ring gear Rc, so that the gear ratio is fixed to a gear ratio. In this fixed gear ratio, hybrid transmission 1 employs only the torque of engine ENG, so that the vehicle travels at a high speed. Second motor/generator MG2 may be operated as a motor to boost the driving torque, or as a generator to charge battery 25 during deceleration of the vehicle. Accordingly, the drivability and the fuel economy are compatible in a high speed driving condition. Thus, with high-mode clutch Chi engaged and low/high-mode brake $B_{LH}$ engaged, hybrid transmission 1 is operated to establish a fixed gear ratio with one degree of freedom. More specifically, in this high speed mode, hybrid controller 21 controls second motor/generator MG2, and engine ENG, to establish the fixed gear ratio of input speed $\omega_{in}$ to output speed $\omega_o$.

In this embodiment, the mode switch control system controls the mode switch from the high speed mode in which only high-mode clutch Chi is engaged to connect front sun gear Sf and front planet-pinion carrier Cf to establish an infinitely variable high gear ratio as shown in FIG. 5, to the low speed mode in which only low-mode brake $B_{LO}$ is engaged to hold against rotation front planet-pinion carrier Cf to establish an infinitely variable low gear ratio as shown in FIG. 2. This control process is executed as follows. First, low-mode brake $B_{LO}$ is engaged to shift the transmission state from the high speed mode as shown in FIG. 5 to the 2nd mode as shown in FIG. 4. Next, high-mode clutch Chi is disengaged to shift the transmission state from the 2nd mode to the low speed mode as shown in FIG. 2. In parallel with these engagement processes, motor/generator torque Tmg2 is controlled.

Without consideration of the torque caused by acceleration of inertia of the rotating elements of hybrid transmission 1, the following balance equations are derived by considering balances of torque and moment of levers in the high speed mode and in the low speed mode.

(The High Speed Mode)

$$To+Te\cdot(1+\beta)/\beta+Tmg1\cdot(1+a+\beta)/\beta=0 \quad (1)$$

$$Tmg2=Tc+Tmg1\cdot a/(1+\beta)+To\cdot\delta/(1+\beta) \quad (2)$$

$$Tmg1=Te\cdot\{\beta\cdot i-(1+\beta)\}/(1+a+\beta) \quad (3)$$

$$Tmg2=Te\cdot\{(a+1)\cdot i-a\}/(1+a+\beta) \quad (4)$$

$$Tc=i\cdot Te\cdot(1+\delta)/(1+\beta) \quad (5)$$

(The Low Speed Mode)

$$To+Te\cdot(1+\beta)/\beta+Tmg1\cdot(1+a+\beta)/\beta=0 \quad (1')$$

$$To+Te+Tmg1+Tmg2+Tb=0 \quad (6)$$

$$(\text{i.e., } Tmg2+Tb=-To-Te-Tmg1) \quad (7)$$

$$Tmg1=Te\cdot\{\beta\cdot i-(1+\beta)\}/(1+a+\beta) \quad (3')$$

$$Tmg2=Te\cdot[\{(\beta-\delta)/(1+\beta)-\beta/(1+a+\beta)\}\cdot i-a/(1+a+\beta)] \quad (8)$$

$$Tb=i\cdot Te\cdot(1+\delta)/(1+\beta) \quad (9)$$

where Te represents the engine torque (transmission input torque), To represents the transmission output torque (negative in the forward speed), i represents the transmission gear ratio of Te to (−To), Tmg1 represents the torque of first motor/generator MG1, Tmg2 represents the torque of second motor/generator MG2, Tb represents the torque imposed on low-mode brake $B_{LO}$, and Tc represents the torque imposed on high-mode clutch Chi.

Alternatively, high-mode clutch Chi may be configured to connect front planet-pinion carrier Cf and front ring gear Rf, or to connect front sun gear Sf and front ring gear Rf, so that the three members of front planetary gearset GF rotate integrally as one piece. In such alternate cases, equation (2) is replaced by the following equations, respectively.

$$Tmg2=Tc\cdot\delta+Tmg1\cdot a/(1+\beta)+To\cdot\delta/(1+\beta) \quad (10)$$

$$Tmg2=Tc\cdot(1+\delta)+Tmg1\cdot a/(1+\beta)+To\cdot\delta/(1+\beta) \quad (11)$$

The fixed gear ratio in the operating state of hybrid transmission 1 as shown in FIG. 4, in which low-mode brake $B_{LO}$ and high-mode clutch Chi are both engaged, is referred to as a mode-switch gear ratio i0 $(=(1+1/\beta))$. The mode-switch gear ratio i0 is used as a reference in the mode switch control, which is a boundary point between the high speed mode and the low speed mode. When the gear ratio is equal to mode-switch gear ratio i0, motor/generator torque Tmg1 and motor/generator torque Tmg2 is determined using equations (3), (4), (3'), and (8), as follows.

(The High Speed Mode)

$$Tmg1=0(i=1+1/\beta) \quad (12)$$

$$Tmg2=Te/\beta(i=1+1/\beta) \quad (13)$$

(The Low Speed Mode)

$$Tmg1=0(i=1+1/\beta) \quad (12')$$

$$Tmg2=-Te\cdot(\delta/\beta)(i=1+1/\beta) \quad (14)$$

As shown in equation (13), motor/generator torque Tmg2 is needed to be a first torque (Te/β) to serve for torque balance in the hybrid transmission in the high speed mode near a mode-switch speed ratio which is a boundary point between the high speed mode and the low speed mode. On the other hand, as shown in equation (14), motor/generator torque Tmg2 is needed to be a second torque (−Te·(δ/β)) opposite in direction to the first torque, to serve for the torque balance in the low speed mode near the mode-switch speed ratio. That is, the change of motor/generator torque Tmg2 includes a discontinuity at mode-switch gear ratio i0. More specifically, motor/generator torque Tmg2 changes from a positive value in the high speed mode to a negative value in the low speed mode, during the process of the mode switch operation. In other words, the operating state of motor/generator torque Tmg2 is changed with a polarity reversal, during the process of the mode switch operation. Accordingly, this torque gap causes a shift shock, if the transmission mode is instantaneously switched between the high speed mode and the low speed mode.

Therefore, the mode switch control system gradually varies the operating state of hybrid transmission 1 between the high speed mode and the low speed mode. That is, the operating state in the high speed mode and the operating state in the low speed mode are combined to produce an intermediate operating state or a transitional operating state. More specifically, in the mode switch from the high speed mode to the low speed mode, the balance equations for the transitional operating state are provided by varying a parameter s ($0 \leq s \leq 1$) from 1 to 0 in the following balance equations.

$$Tmg2=s\cdot Te\cdot\{(a+1)\cdot i-a\}/(1+a+\beta)+(1-s)\cdot Te\cdot[\{(\beta-\delta)/(1+\beta)-\beta/(1+a+\beta)\}\cdot i-a/(1+a+\beta)] \quad (15)$$

$$Tc=s\cdot i\cdot Te\cdot(1+\delta)/(1+\beta) \quad (16)$$

$$Tb=(1-s)\cdot i\cdot Te\cdot(1+\delta)/(1+\beta) \quad (17)$$

Figures 6A, 6B:
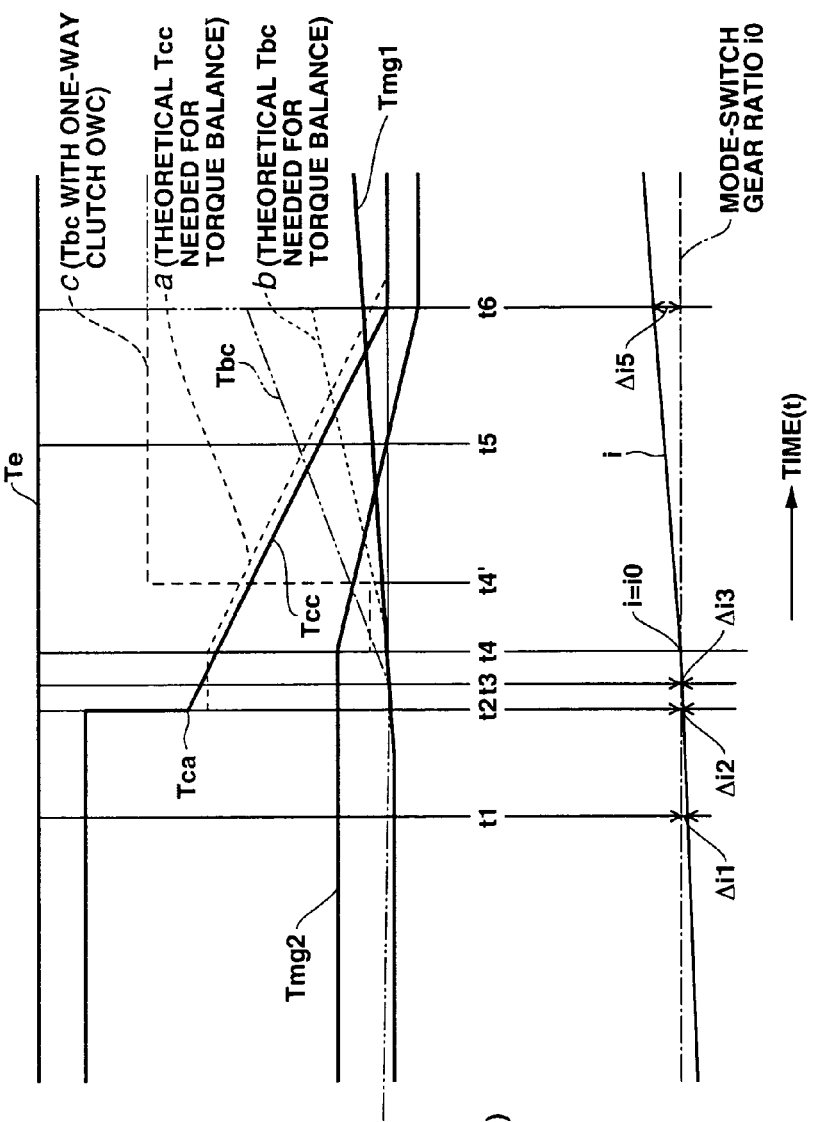
FIGS. 6A and 6B are time charts depicting a process of controlling a mode switch from the high speed mode to the low speed mode, in accordance with an embodiment of the present invention.

In this embodiment of the present invention, the switch of the transmission mode from the infinitely variable high speed mode to the infinitely variable low speed mode is controlled so as not to cause an undue change in the transmission output torque and a discontinuity in a change in the transmission gear ratio. More specifically, the mode switch operation is executed in accordance with a proposed process as shown in time charts in FIGS. 6A and 6B. The time chart of FIG. 6A includes a horizontal axis indicative of time, and a vertical axis indicative of torque or torque capacity. In this time chart, there are shown changes in engine torque Te, motor/generator torque Tmg1, motor/generator torque Tmg2, torque capacity Tbc of low-mode brake $B_{LO}$, torque capacity Tcc of high-mode clutch Chi. The time chart of FIG. 6B includes a horizontal axis indicative of time, and a vertical axis indicative of the gear ratio in the upward direction of which the gear ratio increases or the speed ratio decreases lower. Engine torque Te and motor/generator torque Tmg1 are controlled so that transmission output torque To varies in accordance with a determined target torque, during the process of the mode switch from the high speed mode to the low speed mode. Actually, in this embodiment, with engine torque Te held substantially constant, motor/generator torque Tmg1 is controlled so that transmission output torque To varies in accordance with the target torque. The fixed gear ratio in the operating state of hybrid transmission 1 as shown in FIG. 4, in which low-mode brake $B_{LO}$ and high-mode clutch Chi are both engaged, is referred to as a mode-switch gear ratio i0 $(=(1+1/\beta))$. The mode-switch gear ratio i0 is used as a reference in the mode switch control. Hybrid controller 21 determines the operating condition of hybrid transmission 1 including gear ratio i in accordance with the input information from sensors 27. At a time point t1 when the gear ratio is controlled to slightly increase to be a gear ratio lower by a predetermined gear ratio difference $\Delta i1$ than mode-switch gear ratio i0, hybrid controller 21 issues a command indicative of switching the transmission mode from the high speed mode to the low speed mode. In response to the command, the process of the mode switch control is initiated. The gear ratio used to determine the initiation timing may be an actual gear ratio i or a target gear ratio i*. The actual gear ratio i is determined in accordance with determined input speed $\omega_{in}$ and determined output speed $\omega_o$.

At the start of the process of the mode switch control, hybrid controller 21 executes a preparatory process in advance of the following actual mode switch operation. In the preparatory process, hybrid controller 21 supplies a pre-charge pressure to low-mode brake $B_{LO}$, so that the free travel of low-mode brake $B_{LO}$ is eliminated. The preparatory process lasts until a time point t2 when gear ratio i is controlled to slightly increase to be a gear ratio lower by a predetermined gear ratio difference $\Delta i2$ than mode-switch gear ratio i0. At time point t2, hybrid controller 21 initiates a process of switching the engagement state of the selectively engageable torque-transmitting mechanisms. In this process, hybrid controller 21 switches the engagement state of low-mode brake $B_{LO}$, which needs to be engaged in the low speed mode, from a disengaged condition to an engaged condition. At the same time, hybrid controller 21 switches the engagement state of high-mode clutch Chi, which needs to be engaged in the high speed mode, from an engaged condition to a disengaged condition.

More specifically, at time point t2, hybrid controller 21 instantaneously reduces torque capacity Tcc of high-mode clutch Chi, which is engaged in the high speed mode, to a torque capacity Tca, by reducing the engaging pressure of high-mode clutch Chi. Torque capacity Tca is determined or calculated in accordance with the torque balance equations. Actually, torque capacity Tca is produced by multiplying a theoretical value of needed torque capacity Tcc and a predetermined safety ratio such as 1.2. The theoretical value of needed torque capacity Tcc is determined in accordance with the torque balance equations. After instantaneously reduced to Tca, torque capacity Tcc is reduced linearly in time to zero at a time point t6. Time point t6 is a time point at which it is determined that the clutch/brake switch operation is completed, based on a condition in which gear ratio i is greater by a predetermined gear ratio difference $\Delta i5$ than mode-switch gear ratio i0. During the above-described process in which torque capacity Tcc of high-mode clutch Chi is reduced linearly in time, torque capacity Tcc is adjusted in accordance with the torque balance equations. Actually, torque capacity Tcc is set to a value which is calculated by multiplying the theoretical value of torque capacity Tcc and a predetermined value such as 90%, to promote the change in the operating state of hybrid transmission 1. The theoretical value of needed torque capacity Tcc is determined in accordance with the torque balance equations.

On the other hand, at a time point t3 when gear ratio i is controlled to slightly increase to be a gear ratio lower by a predetermined gear ratio difference $\Delta i3$ than mode-switch gear ratio i0, hybrid controller 21 increases torque capacity Tbc of low-mode brake $B_{LO}$ which is engaged in the low speed mode, by increasing the engaging pressure of low-mode brake $B_{LO}$. Torque capacity Tbc is increased linearly in time by an open-loop control system until time point t6. During the above-described process in which torque capacity Tbc of low-mode brake $B_{LO}$ is increased linearly in time, torque capacity Tbc is adjusted in accordance with the balance equations. Actually, torque capacity Tbc is set to a value which is produced by adding the product of the theoretical value of torque capacity Tbc and a predetermined value such as 1.4, and the product of the theoretical value of torque capacity Tbc after the mode switch and a predetermined value such as 10%, to provide an adequate margin. The theoretical value of torque capacity Tbc is determined in accordance with the torque balance equations. It is ideal that low-mode brake $B_{LO}$ is engaged completely and instantaneously just at a time point t4 when gear ratio i is equal to mode-switch gear ratio i0, and that low-mode brake $B_{LO}$ keeps engaged with no slip after time point t4. However, if the timing of the engagement of low-mode brake $B_{LO}$ is shifted from time point t4, a shift shock is caused in the mode switch process. Therefore, torque capacity Tbc of low-mode brake $B_{LO}$ is increased smoothly and linearly in time not so as to cause a shift shock even if the timing of the engagement of low-mode brake $B_{LO}$ is shifted from time point t4. At time point t6, hybrid controller 21 terminates the above described intermediate control process, and completely engages low-mode brake $B_{LO}$ to increase torque capacity Tbc of low-mode brake $B_{LO}$ to a maximum value.

In parallel with the above processes of the mode switch operation, hybrid controller 21 varies motor/generator torque Tmg2 to a target, in connection with the reduction of torque capacity Tcc of high-mode clutch Chi. The variation of motor/generator torque Tmg2 is initiated at a point when the gear ratio is near mode-switch gear ratio i0, and is completed at a time point when the gear ratio is higher than mode-switch gear ratio i0. More specifically, hybrid controller 21 reduces motor/generator torque Tmg2 linearly in time from a torque needed in the high speed mode to a torque needed in the low speed mode, in accordance with a change in gear ratio i, between time point t4 and time point t6. In other words, motor/generator torque Tmg2 decreases from a positive value to zero at a time point t5, turns to be negative, and increases in the negative direction. In the reverse speed ratio, this variation is inverted.

In this manner, engine torque Te, motor/generator torque Tmg1, motor/generator torque Tmg2 are controlled in accordance with the control law of the high speed mode, until time point t4 at which gear ratio i is equal to mode-switch gear ratio i0. After time point t4, engine torque Te, and motor/generator torque Tmg1 are controlled so that output torque Tout varies in accordance with a determined target, while motor/generator torque Tmg2, torque capacity Tcc, and torque capacity Tbc are controlled as discussed above. At time point t6, the process of the mode switch control is terminated. After time point t6, hybrid controller 21 controls hybrid transmission 1 in accordance with the control law of the low speed mode.

Figure 9:
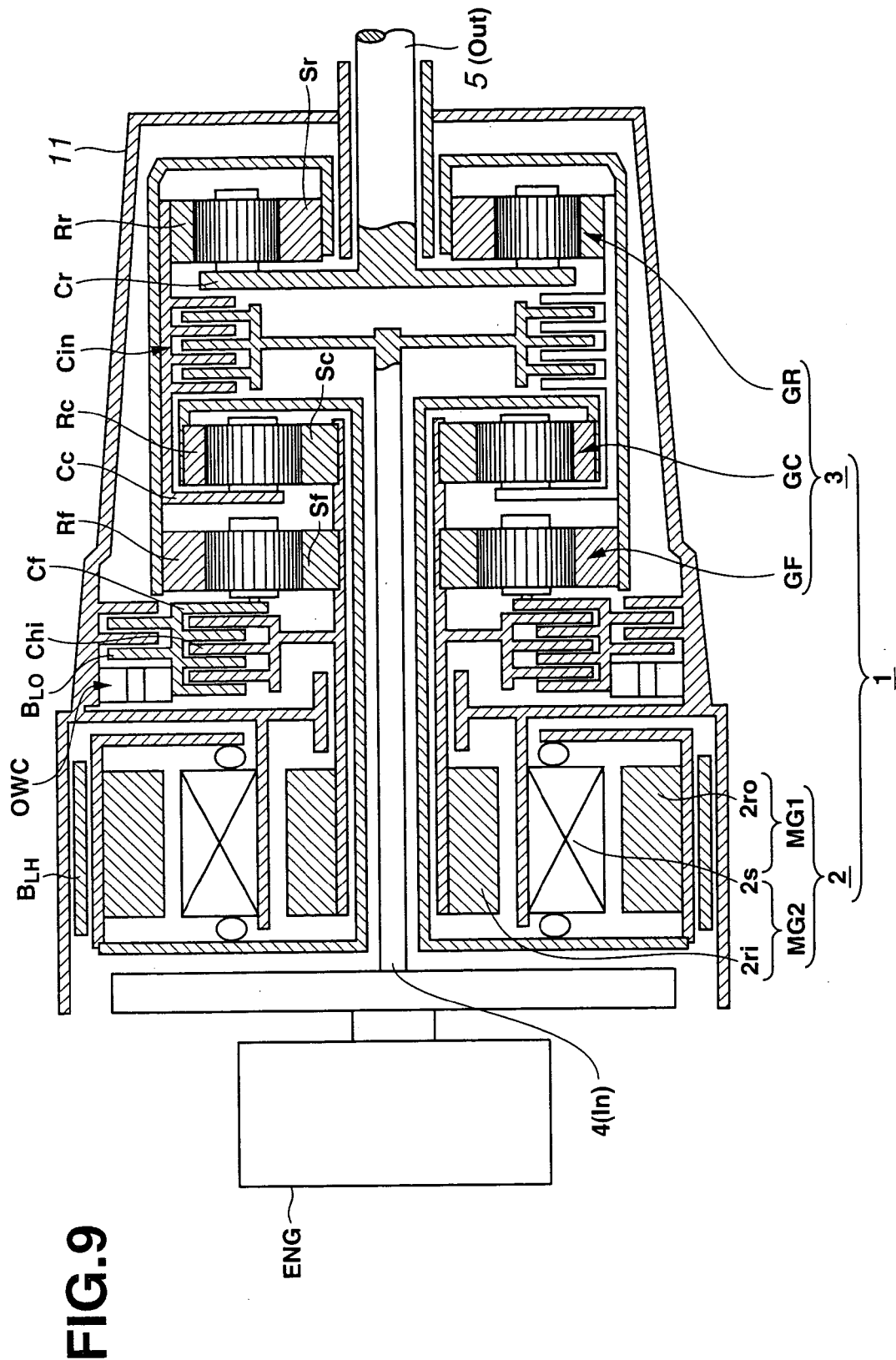
FIG. 9 is a schematic diagram depicting a hybrid transmission and a mode switch control system for the hybrid transmission in accordance with another embodiment of the present invention.

FIG. 9 shows a hybrid transmission modified based on the hybrid transmission of FIG. 1. As shown in FIG. 9, the modified hybrid transmission further includes a one-way clutch OWC in parallel with low-mode brake $B_{LO}$. One-way clutch OWC functions as part of low-mode brake $B_{LO}$ of the above-described embodiment, to serve for establishing the low speed mode. In this embodiment, torque capacity Tbc of low-mode brake $B_{LO}$ is controlled more easily than in the above-described embodiment. Low-mode brake $B_{LO}$ is engaged at an intermediate time point of the control process after one-way clutch OWC starting to provide torque transmission. More specifically, at time point t4 when the rotational speed of front planet-pinion carrier Cf is equal to zero, one-way clutch OWC automatically starts to function to provide its torque capacity. At a time point t4' when gear ratio i is controlled to slightly increase to be a gear ratio lower by a predetermined gear ratio difference than mode-switch gear ratio i0, hybrid controller 21 instantaneously and completely engages low-mode brake $B_{LO}$. Integrated torque capacity Tbc, which is the sum of the torque capacity of one-way clutch OWC and torque capacity Tbc of low-mode brake $B_{LO}$, changes as indicated by line c in FIG. 6, to provide enough torque capacity to hold against rotation front planet-pinion carrier Cf. This operation can be controlled by a simple control law. In addition, with one-way clutch OWC, the maximum torque capacity of low-mode brake $B_{LO}$ may be smaller by the amount of the torque capacity of one-way clutch OWC than in the previous embodiment, accordingly.

As discussed above, in the mode switch control from the high speed mode to the low speed mode in accordance with the shown embodiments of the present invention, torque capacity Tcc of high-mode clutch Chi and motor/generator torque Tmg2 are integrally controlled in connection with each other. Therefore, the mode switch control system avoids an undesired change in the transmission output torque and a discontinuity in the gear ratio, which are caused by the change of motor/generator torque Tmg2 which includes a polarity reversal. Thus, the transmission mode is smoothly shifted from the high speed mode to the low speed mode.

In the above-mentioned embodiments, the control of torque capacity Tcc and motor/generator torque Tmg2 in the mode switch operation is each implemented by a feedforward control system or by an open-loop control system. In contrast to this simple control, it is more preferable that one of torque capacity Tcc and motor/generator torque Tmg2 is controlled by an open-loop control system, and that the other is controlled by a feedback control system so that a specific state variable of hybrid transmission 1 varies in accordance with a target value. By this control, gear ratio i changes more smoothly and more continuously.

The following describes another control method of the mode switch in accordance with another embodiment of the present invention. In this embodiment, hybrid controller 21 controls torque capacity Tcc of high-mode clutch Chi by an open-loop control system, and motor/generator torque Tmg2 by a feedback control system. More specifically, the mode switch operation is executed in accordance with a proposed process as shown in time charts in FIGS. 7A and 7B. Engine torque Te and motor/generator torque Tmg1 are controlled so that transmission output torque To varies in accordance with a determined target torque, during the process of the mode switch from the infinitely variable high speed mode to the infinitely variable low speed mode. At a time point t1 when the gear ratio is controlled to slightly increase to be a gear ratio lower by a predetermined gear ratio difference $\Delta i1$ than mode-switch gear ratio i0, the process of the mode switch control is initiated. The gear ratio used to determine the initiation timing may be an actual gear ratio i or a target gear ratio i*.

At the start of the process of the mode switch control, hybrid controller 21 executes a preparatory process in advance of the following actual mode switch operation. In the preparatory process, hybrid controller 21 supplies a pre-charge pressure to low-mode brake $B_{LO}$, so that the free travel of low-mode brake $B_{LO}$ is eliminated. The preparatory process lasts until a time point t2 when gear ratio i is controlled to slightly increase to be a gear ratio lower by a predetermined gear ratio difference $\Delta i2$ than mode-switch gear ratio i0. At time point t2, hybrid controller 21 initiates a process of switching the engagement state of the selectively engageable torque-transmitting mechanisms. In this process, hybrid controller 21 switches the engagement state of low-mode brake $B_{LO}$, which needs to be engaged in the low speed mode, from a disengaged condition to an engaged condition. At the same time, hybrid controller 21 switches the engagement state of high-mode clutch Chi, which needs to be engaged in the high speed mode, from an engaged condition to a disengaged condition.

More specifically, at time point t2, hybrid controller 21 instantaneously reduces torque capacity Tcc of high-mode clutch Chi, which is engaged in the high speed mode, to a torque capacity Tca, by reducing the engaging pressure of high-mode clutch Chi. Torque capacity Tca is determined or calculated in accordance with the torque balance equations. Actually, torque capacity Tca is produced by multiplying a theoretical value of needed torque capacity Tcc and a predetermined safety ratio such as 1.2. The theoretical value of needed torque capacity Tcc is determined in accordance with the torque balance equations. After instantaneously reduced to Tca, torque capacity Tcc is reduced linearly in time to zero at a time point t6. Time point t6 is a time point at which it is determined that the clutch/brake switch operation is completed, based on a condition in which gear ratio i is greater by a predetermined gear ratio difference $\Delta i5$ than mode-switch gear ratio i0. During the above-described process in which torque capacity Tcc of high-mode clutch Chi is reduced linearly in time, torque capacity Tcc is adjusted in accordance with the torque balance equations. Actually, torque capacity Tcc is set to a value which is calculated by multiplying the theoretical value of torque capacity Tcc and a predetermined value such as 90%, to promote the change in the operating state of hybrid transmission 1. The theoretical value of needed torque capacity Tcc is determined in accordance with the torque balance equations.

On the other hand, at a time point t3 when gear ratio i is controlled to slightly increase to be a gear ratio lower by a predetermined gear ratio difference Δi3 than mode-switch gear ratio i0, hybrid controller 21 increases torque capacity Tbc of low-mode brake $B_{LO}$ which is engaged in the low speed mode, by increasing the engaging pressure of low-mode brake $B_{LO}$. Torque capacity Tbc is increased linearly in time until time point t6. During the above-described process in which torque capacity Tbc of low-mode brake $B_{LO}$ is increased linearly in time, torque capacity Tbc is adjusted in accordance with the balance equations. Actually, torque capacity Tbc is set to a value which is produced by adding the product of the theoretical value of torque capacity Tbc and a predetermined value such as 1.4, and the product of the theoretical value of torque capacity Tbc after the mode switch and a predetermined value such as 10%, to provide an adequate margin. The theoretical value of torque capacity Tbc is determined in accordance with the torque balance equations. It is ideal that low-mode brake $B_{LO}$ is engaged completely and instantaneously just at a time point t4 when gear ratio i is equal to mode-switch gear ratio i0, and that low-mode brake $B_{LO}$ keeps engaged with no slip after time point t4. However, if the timing of the engagement of low-mode brake $B_{LO}$ is shifted from time point t4, a shift shock is caused in the mode switch process. Therefore, torque capacity Tbc of low-mode brake $B_{LO}$ is increased smoothly and linearly in time not so as to cause a shift shock even if the timing of the engagement of low-mode brake $B_{LO}$ is shifted from time point t4. At time point t6, hybrid controller 21 terminates the above described intermediate control process, and completely engages low-mode brake $B_{LO}$ to increase torque capacity Tbc of low-mode brake $B_{LO}$ to a maximum value.

In parallel with the above processes of the mode switch operation, hybrid controller 21 controls motor/generator torque Tmg2 so that gear ratio i (or the speed ratio 1/i) changes in accordance with target gear ratio i* as shown in FIG. 7B, with a feedback of the difference between gear ratio i and target gear ratio i*. This control is executed between time point t3' and time point t7. Time point t3' is when gear ratio i is controlled to slightly increase to be smaller by a predetermined gear ratio difference Δi4 than mode-switch gear ratio i0. Time point t7 is when gear ratio i is controlled to slightly increase to be greater by a predetermined gear ratio difference Δi6 than mode-switch gear ratio i0 (Δi6>Δi5). Thus, the rotational speed of motor/generator torque Tmg2 is reduced from a torque needed in the high speed mode to a torque needed in the low speed mode, in accordance with a change in gear ratio i. In other words, motor/generator torque Tmg2 decreases from a positive value to zero at a time point t5, turns to be negative, and increases in the negative direction. If transmission output torque To is negative, this variation is inverted.

The above-mentioned feedback control of motor/generator torque Tmg2 is implemented as follows. First, actual gear ratio i ($=\omega_{in}/\omega_o$) is calculated with input speed $\omega_{in}$ and output speed $\omega_o$. An adjustment for motor/generator torque Tmg2 is determined by a PID control (a combination of Proportional control, Integral control, and Differential control) in accordance with the difference between actual gear ratio i and target gear ratio i*. This adjustment is added to the theoretical value of motor/generator torque Tmg2 derived from the torque balance equations, to produce an adjusted motor/generator torque Tmg2. Motor/generator torque Tmg2 is controlled in accordance with a command indicative of the adjusted motor/generator torque Tmg2.

In this manner, engine torque Te, motor/generator torque Tmg1, motor/generator torque Tmg2 are controlled in accordance with the control law of the high speed mode, until time point t3' when gear ratio i is controlled to slightly increase to be smaller by a predetermined gear ratio difference Δi4 than mode-switch gear ratio i0. After time point t3', engine torque Te, and motor/generator torque Tmg1 are controlled so that output torque Tout varies in accordance with a target, while motor/generator torque Tmg2, torque capacity Tcc, and torque capacity Tbc are controlled as discussed above. At time point t7 when gear ratio i is controlled to slightly increase to be greater by a predetermined gear ratio difference Δi6 than mode-switch gear ratio i0, the process of the mode switch control is terminated. After time point t7, hybrid controller 21 controls hybrid transmission 1 in accordance with the control law of the low speed mode.

The above-mentioned control method is applied to the modified hybrid transmission as shown in FIG. 9, which includes one-way clutch OWC in parallel with low-mode brake $B_{LO}$. One-way clutch OWC functions as part of low-mode brake $B_{LO}$ of the above-described embodiment, to serve for establishing the low speed mode. In this embodiment, torque capacity Tbc of low-mode brake $B_{LO}$ is controlled more easily than in the above-described embodiment, as in the previous embodiment. Accordingly, this operation can be controlled by a simple control law. In addition, with one-way clutch OWC, the maximum torque capacity of low-mode brake $B_{LO}$ may be smaller by the amount of the torque capacity of one-way clutch OWC than in the previous embodiment, accordingly.

As discussed above, in the mode switch control from the high speed mode to the low speed mode in accordance with the shown embodiments of the present invention, torque capacity Tcc of high-mode clutch Chi and motor/generator torque Tmg2 are integrally controlled in connection with each other. Therefore, the mode switch control system avoids an undesired change in the transmission output torque and a discontinuity in the gear ratio, which are caused by the change of motor/generator torque Tmg2 which includes a polarity reversal. Thus, the transmission mode is smoothly shifted from the high speed mode to the low speed mode.

In addition, the mode switch control system controls torque capacity Tcc of high-mode clutch Chi by an open-loop control system, and motor/generator torque Tmg2 by a feedback control system, so that gear ratio i varies in accordance with target gear ratio i*. Accordingly, the mode switch control system provides a more smooth change in gear ratio i without a discontinuity, in accordance with target gear ratio i*, while the mode switch control system executes the mode switch.

The following describes another control method of the mode switch in accordance with another embodiment of the present invention. In contrast to the mode switch control in the above-mentioned embodiment, motor/generator torque Tmg2 is controlled by an open-loop control system, and torque capacity Tcc of high-mode clutch Chi is controlled by a feedback control system. More specifically, the mode switch operation is executed in accordance with a proposed process as shown in time charts in FIGS. 8A and 8B. Engine torque Te and motor/generator torque Tmg1 are controlled so that transmission output torque To varies in accordance with a determined target torque, during the process of the mode switch from the infinitely variable high speed mode to the infinitely variable low speed mode. At a time point t1 when the gear ratio is controlled to slightly increase to be a gear ratio lower by a predetermined gear ratio difference Δi1 than mode-switch gear ratio i0, the process of the mode switch control is initiated. The gear ratio used to determine the initiation timing may be an actual gear ratio i or a target gear ratio i*.

At the start of the process of the mode switch control, hybrid controller 21 executes a preparatory process in advance of the following actual mode switch operation. In the preparatory process, hybrid controller 21 supplies a pre-charge pressure to low-mode brake $B_{LO}$, so that the free travel of low-mode brake $B_{LO}$ is eliminated. The preparatory process lasts until a time point t2 when gear ratio i is controlled to slightly increase to be a gear ratio lower by a predetermined gear ratio difference $\Delta i2$ than mode-switch gear ratio i0. At time point t2, hybrid controller 21 initiates a process of switching the engagement state of the selectively engageable torque-transmitting mechanisms. In this process, hybrid controller 21 switches the engagement state of low-mode brake $B_{LO}$, which needs to be engaged in the low speed mode, from a disengaged condition to an engaged condition. At the same time, hybrid controller 21 switches the engagement state of high-mode clutch Chi, which needs to be engaged in the high speed mode, from an engaged condition to a disengaged condition.

More specifically, at time point t2, hybrid controller 21 instantaneously reduces torque capacity Tcc of high-mode clutch Chi, which is engaged in the high speed mode, to a torque capacity Tca, by reducing the engaging pressure of high-mode clutch Chi. Torque capacity Tca is determined or calculated in accordance with the torque balance equations. Actually, torque capacity Tca is produced by multiplying a theoretical value of needed torque capacity Tcc and a predetermined safety ratio such as 1.2. The theoretical value of needed torque capacity Tcc is determined in accordance with the torque balance equations. After instantaneously reduced to Tca, torque capacity Tcc is held to Tca until time point t4 when gear ratio i is equal to mode-switch gear ratio i0.

On the other hand, at a time point t3 when gear ratio i is controlled to slightly increase to be a gear ratio lower by a predetermined gear ratio difference $\Delta i3$ than mode-switch gear ratio i0, hybrid controller 21 increases torque capacity Tbc of low-mode brake $B_{LO}$ which is engaged in the low speed mode, by increasing the engaging pressure of low-mode brake $B_{LO}$. Torque capacity Tbc is increased linearly in time until time point t6. During the above-described process in which torque capacity Tbc of low-mode brake $B_{LO}$ is increased linearly in time, torque capacity Tbc is adjusted in accordance with the balance equations. Actually, torque capacity Tbc is set to a value which is produced by adding the product of the theoretical value of torque capacity Tbc and a predetermined value such as 1.4, and the product of the theoretical value of torque capacity Tbc after the mode switch and a predetermined value such as 10%, to provide an adequate margin. The theoretical value of torque capacity Tbc is determined in accordance with the torque balance equations. It is ideal that low-mode brake $B_{LO}$ is engaged completely and instantaneously just at a time point t4 when gear ratio i is equal to mode-switch gear ratio i0, and that low-mode brake $B_{LO}$ keeps engaged with no slip after time point t4. However, if the timing of the engagement of low-mode brake $B_{LO}$ is shifted from time point t4, a shift shock is caused in the mode switch process. Therefore, torque capacity Tbc of low-mode brake $B_{LO}$ is increased smoothly and linearly in time not so as to cause a shift shock even if the timing of the engagement of low-mode brake $B_{LO}$ is shifted from time point t4. At time point t7 when gear ratio i is controlled to slightly increase to be greater by a predetermined gear ratio difference $\Delta i6$ than mode-switch gear ratio i0, the above described intermediate control process is terminated, and low-mode brake $B_{LO}$ is completely engaged to increase torque capacity Tbc of low-mode brake $B_{LO}$ to a maximum value.

In parallel with the above processes of the mode switch operation, hybrid controller 21 reduces motor/generator torque Tmg2 linearly in time from a torque needed in the high speed mode to a torque needed in the low speed mode, in accordance with a change in gear ratio i, between time point t3' when gear ratio i is controlled to slightly increase to be smaller by a predetermined gear ratio difference $\Delta i4$ than mode-switch gear ratio i0 and time point t6. In other words, motor/generator torque Tmg2 decreases from a positive value to zero at a time point t5, turns to be negative, and increases in the negative direction. If transmission output torque To is negative, this variation is inverted.

As discussed above, at time point t2, hybrid controller 21 instantaneously reduces torque capacity Tcc of high-mode clutch Chi to a torque capacity Tca, and keeps torque capacity Tcc to Tca until time point t4. Hybrid controller 21 controls torque capacity Tcc of high-mode clutch Chi so that gear ratio i changes in accordance with target gear ratio i* as shown in FIG. 8B, with a feedback of the difference between gear ratio i and target gear ratio i*. This control is executed between time point t4 and time point t6. Thus, torque capacity Tcc of high-mode clutch Chi is reduced from Tca to zero, in accordance with a change in gear ratio i. As in motor/generator torque Tmg2 in the previous embodiment, torque capacity Tcc is controlled by a PID control in accordance with the difference between actual gear ratio i and target gear ratio i*.

In this manner, engine torque Te, motor/generator torque Tmg1, motor/generator torque Tmg2 are controlled in accordance with the control law of the high speed mode, until time point t3' when gear ratio i is controlled to slightly increase to be smaller by a predetermined gear ratio difference $\Delta i4$ than mode-switch gear ratio i0. After time point t3', engine torque Te, and motor/generator torque Tmg1 are controlled so that output torque Tout varies in accordance with a target, while motor/generator torque Tmg2, torque capacity Tcc, and torque capacity Tbc are controlled as discussed above. At time point t7 when gear ratio i is controlled to slightly increase to be greater by a predetermined gear ratio difference $\Delta i6$ than mode-switch gear ratio i0, the process of the mode switch control is terminated. After time point t7, hybrid controller 21 controls hybrid transmission 1 in accordance with the control law of the low speed mode.

The above-mentioned control method is applied to the modified hybrid transmission as shown in FIG. 9, which includes one-way clutch OWC in parallel with low-mode brake $B_{LO}$. One-way clutch OWC functions as part of low-mode brake $B_{LO}$ of the above-described embodiment, to serve for establishing the low speed mode. In this embodiment, torque capacity Tbc of low-mode brake $B_{LO}$ is controlled more easily than in the above-described embodiment, as in the previous embodiment. This operation can be controlled by a simple control law. In addition, with one-way clutch OWC, the maximum torque capacity of low-mode brake $B_{LO}$ may be smaller by the amount of the torque capacity of one-way clutch OWC than in the previous embodiment, accordingly.

As discussed above, in the mode switch control from the high speed mode to the low speed mode in accordance with the shown embodiments of the present invention, torque capacity Tcc of high-mode clutch Chi and motor/generator torque Tmg2 are integrally controlled in connection with each other. Therefore, the mode switch control system avoids an undesired change in the transmission output torque and a discontinuity in the gear ratio, which are caused by the change of motor/generator torque Tmg2 which includes a polarity reversal. Thus, the transmission mode is smoothly shifted from the high speed mode to the low speed mode.

In addition, the mode switch control system controls motor/generator torque Tmg2 by an open-loop control system, and torque capacity Tcc of high-mode clutch Chi by a feedback control system, so that gear ratio i follows target gear ratio i*. Accordingly, the mode switch control system provides a more smooth change in gear ratio i without a discontinuity, in accordance with target gear ratio i*, while the mode switch control system executes the mode switch.

In all the shown embodiments, the mode switch control system increases torque capacity Tbc of low-mode brake $B_{LO}$, which is released in the high speed mode, in synchronization with the ganged control of reducing torque capacity Tcc of high-mode clutch Chi and varying motor/generator torque Tmg2. With this control, torque capacity Tbc of low-mode brake $B_{LO}$ is properly increased, to avoid a tendency of a potential interlock in the hybrid transmission in the mode switch process, even if one-way clutch OWC is not provided.

In all the shown embodiments, the mode switch control system controls motor/generator torque Tmg2, so that motor/generator torque Tmg2 starts to change at a time point when gear ratio i is increasing to be near mode-switch gear ratio i0, and stops to change at a time point when gear ratio i exceeds mode-switch gear ratio i0. Accordingly, the mode switch control system prevents a shift shock which is caused in case the polarity reversal in motor/generator torque Tmg2 occurs before gear ratio i reaching mode-switch gear ratio i0, that is, a shift shock which is caused in case gear ratio i changes instantaneously to mode-switch gear ratio i0.

Figure 10:
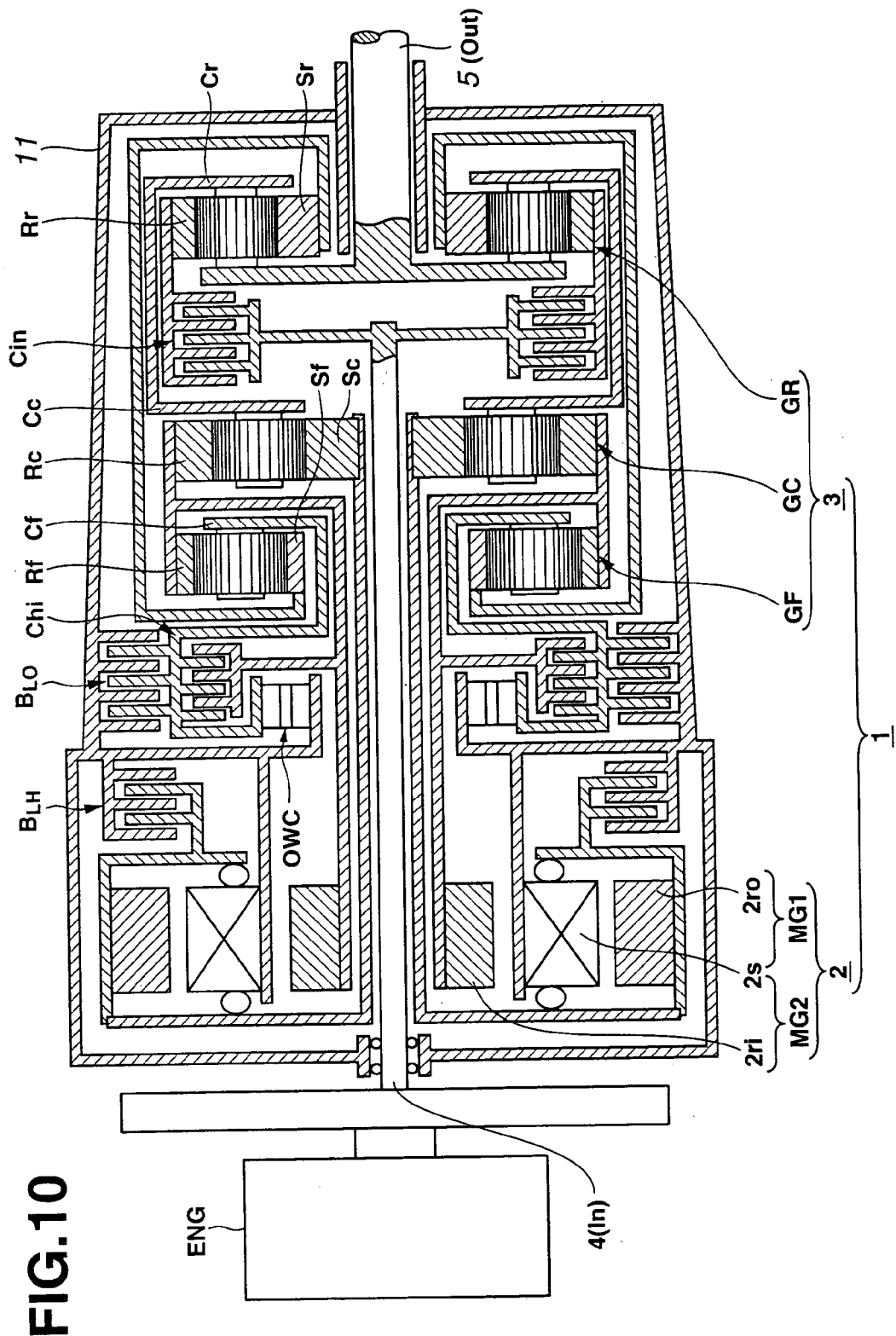
FIG. 10 is a schematic diagram depicting a hybrid transmission and a mode switch control system for the hybrid transmission in accordance with another embodiment of the present invention.

Although in the shown embodiments the mode switch control system is applied to the hybrid transmissions as shown in FIGS. 1 and 9, the mode switch control system may be applied to other hybrid transmissions such as a hybrid transmission as shown in FIG. 10.

FIG. 10 is a schematic diagram depicting hybrid transmission 1 in accordance with an embodiment of the present invention. Hybrid transmission 1 is configured to be mounted on automotive vehicles, especially suitable for a front engine, rear drive, vehicle.

As shown in FIG. 10, hybrid transmission 1 includes transmission housing 11 formed into a tubular shape. Transmission housing 11 houses three planetary gearsets in a rear section located far from an engine ENG in the axial direction (on the right side in the horizontal direction in FIG. 1). More specifically, front planetary gearset GF is mounted nearer to engine ENG. Rear planetary gearset GR is mounted farer from engine ENG. Between front planetary gearset GF and rear planetary gearset GR is disposed central planetary gearset GC. All these planetary gearsets are mounted coaxially with transmission housing 11. In a front section of transmission housing 11 which is nearer to engine ENG (on the left side in FIG. 1), a pair of motor/generators such as compound-current double-layer motor 12 is mounted coaxially with planetary gearsets GF, GC, and GR, or with transmission housing 11.

Front planetary gearset GF, central planetary gearset GC, and rear planetary gearset GR are combined to provide a differential unit 3 with three degrees of freedom, as follows. Front planetary gearset GF is a simple planetary gear including three major rotating elements of a front sun gear Sf, a front ring gear Rf, and a front planet-pinion carrier Cf. Central planetary gearset GC is a simple planetary gear including three major rotating elements of a central sun gear Sc, a central ring gear Rc, and a central planet-pinion carrier Cc. Rear planetary gearset GR is a simple planetary gear including three major rotating elements of a rear sun gear Sr, a rear ring gear Rr, and a rear planet-pinion carrier Cr. Rear ring gear Rr is connected to an input shaft 4 via an engine clutch Cin. Rotation of engine ENG is input to input shaft 4. Engine clutch Cin is selectively engageable to connect rear ring gear Rr and input shaft 4. Rear planet-pinion carrier Cr is coupled to an output shaft 5. In lever diagrams as discussed below, input shaft 4 and output shaft 5 are indicated by "In" and "Out", respectively.

First motor/generator MG1 (or outer rotor 2ro) is connected to central sun gear Sc. Second motor/generator MG2 (or inner rotor 2ri) is connected to front ring gear Rf. Front ring gear Rf is rigidly coupled to central ring gear Rc. The coupled body of front ring gear Rf and central ring gear Rc, and front planet-pinion carrier Cf are connected via a selectively engageable high-mode clutch Chi. Front planet-pinion carrier Cf is selectively held stationary against rotation by a selectively engageable low-mode brake $B_{LO}$, and in the same direction as in the previous embodiment by one-way clutch OWC disposed in parallel. Front sun gear Sf is rigidly coupled to rear sun gear Sr.

Outside outer rotor 2ro is provided a band brake such as a selectively engageable low/high-mode brake $B_{LH}$. Low/high-mode brake $B_{LH}$ is operable to selectively hold against rotation outer rotor 2ro, so as to hold against rotation central sun gear Sc connected to outer rotor 2ro. With selectively engageable torque-transmitting mechanisms disengaged, differential unit 3 has three degrees of freedom. As discussed below, at least one of low-mode brake $B_{LO}$, high-mode clutch Chi, and low/high-mode brake $B_{LH}$ is engaged in any transmission mode, so that differential unit 3 has two or less degrees of freedom. Accordingly, with two of the rotational speeds of the rotating elements of differential unit 3 determined, all the rotational speeds of the rotating elements of differential unit 3 are determined.

FIGS. 11 through 14 show lever diagrams in accordance with operating states of hybrid transmission 1 of FIG. 10. A lever indicated by GF in the lever diagrams represents an operating state of front planetary gearset GF, in which the rotational speed varies monotonously in order of front ring gear Rf, first planet-pinion carrier Cf, and front sun gear Sf. In other words, front ring gear Rf, first planet-pinion carrier Cf, and front sun gear Sf have an extreme rotational speed, an intermediate rotational speed, and another extreme rotational speed, among the three rotating elements of front planetary gearset GF, respectively. A lever GC represents an operating state of central planetary gearset GC, in which the rotational speed varies monotonously in order of central sun gear Sc, central planet-pinion carrier Cc, and central ring gear Rc. In other words, central sun gear Sc, central planet-pinion carrier Cc, and central ring gear Rc have an extreme rotational speed, an intermediate rotational speed, and another extreme rotational speed, among the three rotating elements of central planetary gearset GC, respectively. A lever GR represents an operating state of rear planetary gearset GR, in which the rotational speed varies monotonously in order of rear ring gear Rr, rear planet-pinion carrier Cr, and second sun gear Sr. In other words, rear ring gear Rr, rear planet-pinion carrier Cr, and second sun gear Sr have an extreme rotational speed, an intermediate rotational speed, and another extreme rotational speed, among the three rotating elements of rear planetary gearset GR, respectively.

The central point of lever GR, or rear planet-pinion carrier Cr, and the central point of central planetary gearset GC, or central planet-pinion carrier Cc, are connected to each other. At the left point of lever GR, the rotation of engine ENG is input via engine clutch Cin (input In). Rear sun gear Sr at the right point of lever GR is connected to front sun gear Sf at the right point of lever GF. Central ring gear Rc at the right point of lever GC is connected to front ring gear Rf at the left point of lever GF.

Low-mode brake $B_{LO}$ is operable to selectively hold against rotation front planet-pinion carrier Cf at the central point of lever GF. High-mode clutch Chi is engageable to selectively connect front ring gear Rf at the left point, and front planet-pinion carrier Cf at the central point, of lever GF. Central sun gear Sc at the left point of lever GC is connected to first motor/generator MG1. Central ring gear Rc at the right point of lever GC is connected to second motor/generator MG2. Rear planet-pinion carrier Cr at the central point of lever GR is connected to output shaft 5 (output Out to the driven wheels (not shown)). Low/high-mode brake $B_{LH}$ is operable to selectively hold against rotation central sun gear Sc at the left point of lever GC.

The lever diagrams as shown in FIGS. 11 through 14 represent operating states of hybrid transmission 1. Relative distances between the rotating elements along the horizontal axis of the lever diagram are determined by gear ratios between the rotating elements of hybrid transmission 1. In central planetary gearset GC and rear planetary gearset GR, with the distance between rear ring gear Rr and rear planet-pinion carrier Cr set to 1 as a reference, the distance between central sun gear Sc and rear ring gear Rr is a, and the distance between rear planet-pinion carrier Cr and rear sun gear Sr, or the distance between central planet-pinion carrier Cc and central ring gear Rc is β. In front planetary gearset GF, with the distance between front ring gear Rf and front planet-pinion carrier Cf set to 1 as a reference, the distance between front planet-pinion carrier Cf and front sun gear Sf is δ. Positions along the vertical axis of the lever diagram indicate rotational speeds of the rotating elements. A positive position above zero indicates a forward (normal) rotation, while a negative position below zero indicates a backward (reverse) rotation.

Figure 11:
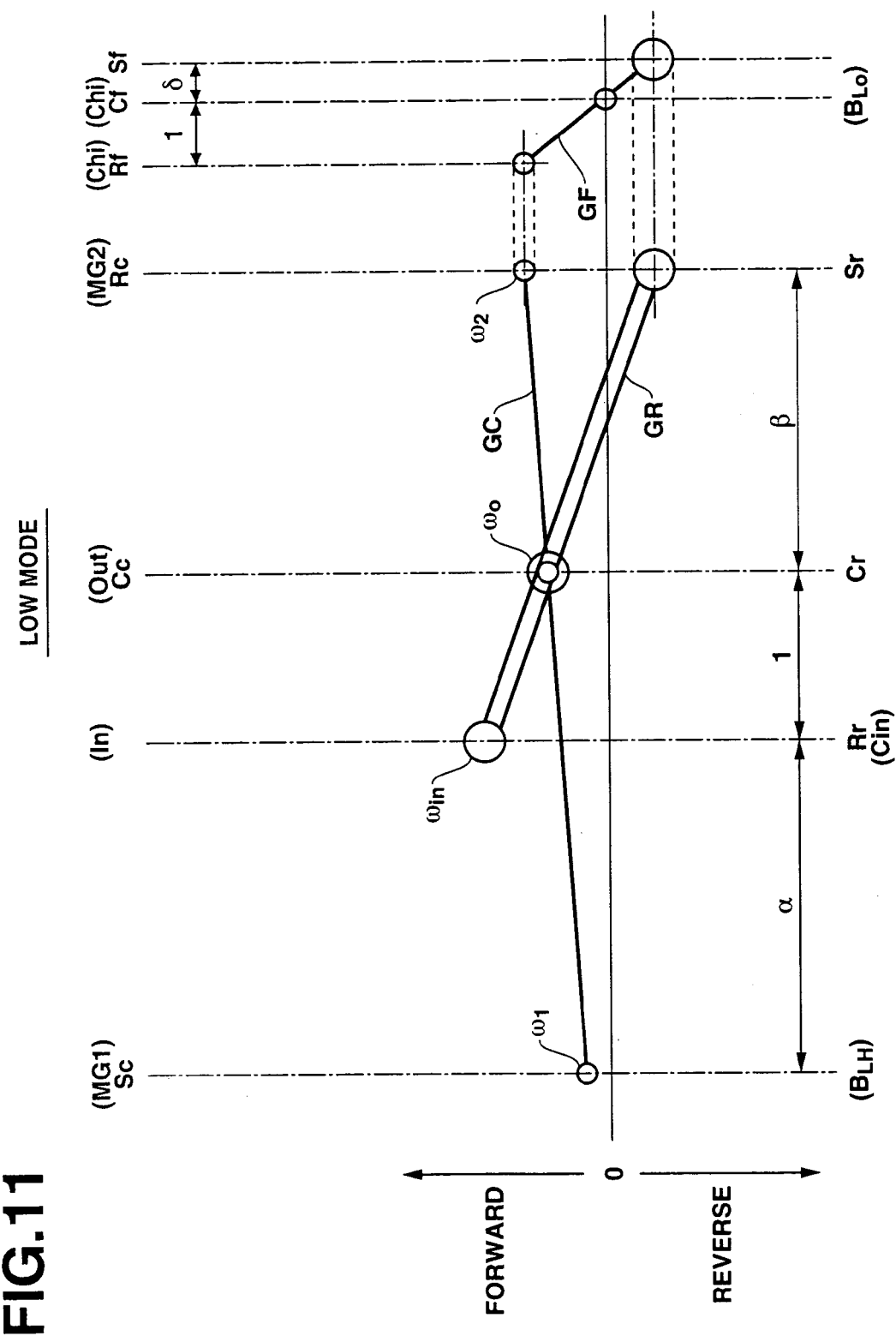
FIG. 11 is a lever diagram depicting an operating state of the hybrid transmission of FIG. 1 in a low speed mode.

FIG. 11 shows a low speed mode of hybrid transmission 1. In the low speed mode, low-mode brake $B_{LO}$ is engaged to hold against rotation front planet-pinion carrier Cf at the central point of lever GF. With the rotational speed of front planet-pinion carrier Cf being zero, rear sun gear Sr (and front sun gear Sf) rotates reversely at a rotational speed determined by the gear ratio of front sun gear Sf to front ring gear Rf with respect to central ring gear Rc (and front ring gear Rf). Accordingly, as seen in FIG. 11, output speed $\omega_o$ of output Out connected to rear planet-pinion carrier Cr at the central point of lever GR (central planet-pinion carrier Cc) is lower than input speed $\omega_{in}$ of input In connected to rear ring gear Rr at the left point of lever GR, that is, than the engine speed input via engine clutch Cin. The low speed mode is employed for a gear ratio range from a gear ratio at which the rotational speed of central sun gear Sc and front sun gear Sf is zero to infinity in the forward speed range. The unique gear ratio as a boundary point between the high speed mode and the low speed mode is equal to $(1+1/\beta)$. The low speed mode is also employed for the reverse speed range.

With input speed $\omega_{in}$ fixed to a constant speed, the magnitude of the rotational speed of front sun gear Sf increases with positively increasing rotational speed of front ring gear Rf. With the increase in the magnitude of the rotational speed of front sun gear Sf, output speed $\omega_o$ decreases. Accordingly, the gear ratio increases higher (to lower speed ratios), then to infinity (output speed $\omega_o$ being zero), and further to a range of reverse gear ratios, with increasing rotational speed of front ring gear Rf.

In the low speed mode, with low-mode brake $B_{LO}$ engaged, hybrid transmission 1 is operated to establish infinitely variable gear ratio with two degrees of freedom. More specifically, in the low speed mode, hybrid controller 21 controls first motor/generator MG1, second motor/generator MG2, and engine ENG, to establish an arbitrary gear ratio of input speed $\omega_{in}$ to output speed $\omega_o$.

Alternatively, in the low speed mode, low/high-mode brake $B_{LH}$ may be further engaged to hold against rotation central sun gear Sc, so that the gear ratio is fixed to a gear ratio $(=(1+1/\beta))$. In this fixed gear ratio, the torque of engine ENG and the torque of second motor/generator MG2 are combined to produce a large driving torque, so that the vehicle can travel by a large torque at a low speed. Second motor/generator MG2 may be operated as a generator in this mode, canceling a part of the torque input from engine ENG, so as to produce a reduced driving torque and at the same time to charge battery 25. Thus, with low-mode brake $B_{LO}$ engaged and low/high-mode brake $B_{LH}$ engaged, hybrid transmission 1 is operated to establish a fixed gear ratio with one degree of freedom. More specifically, in this fixed low speed mode, hybrid controller 21 controls second motor/generator MG2, and engine ENG, to establish the fixed gear ratio of input speed $\omega_{in}$ to output speed $\omega_o$.

Figure 12:
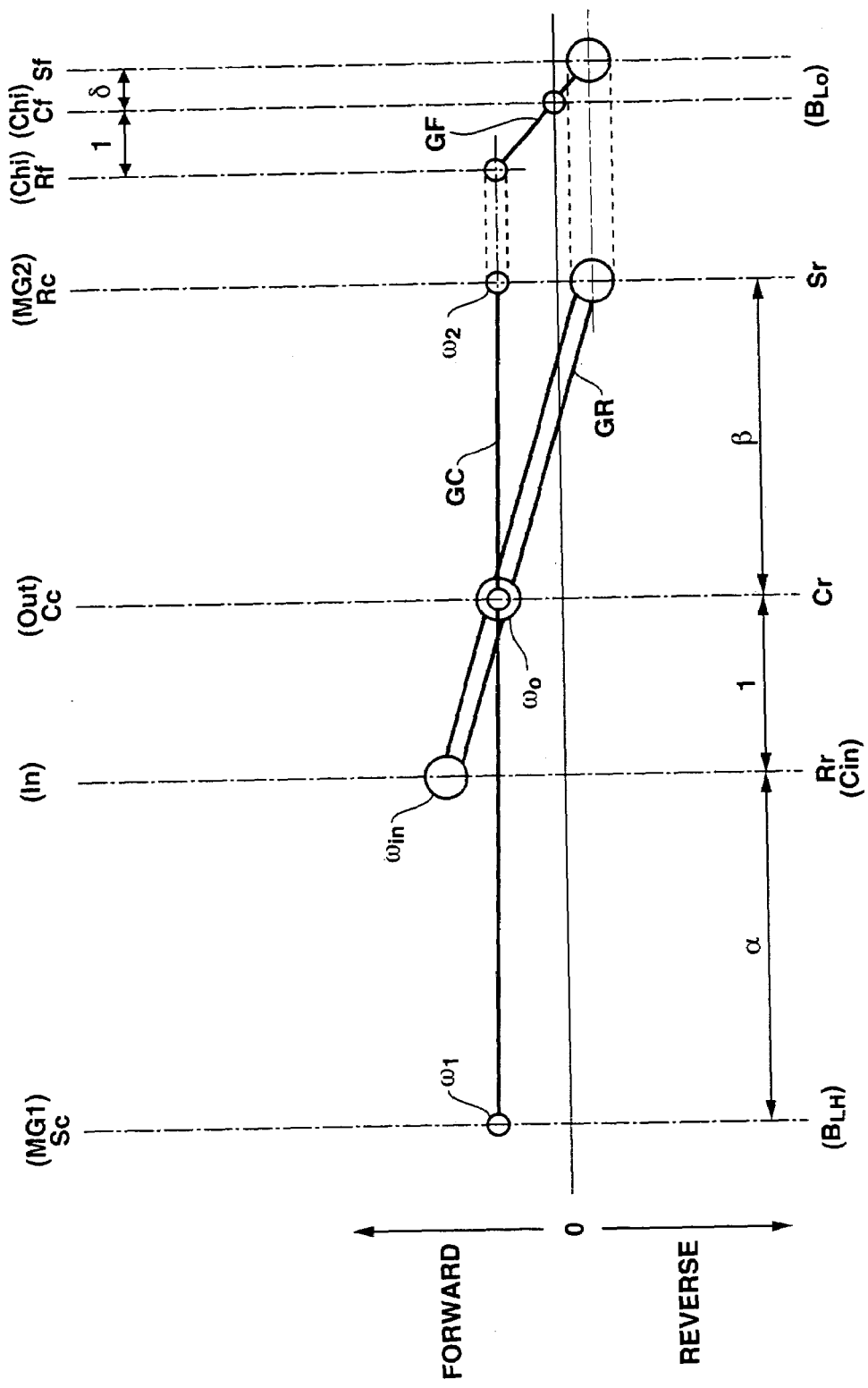
FIG. 12 is a lever diagram depicting an operating state of the hybrid transmission of FIG. 1 in a transition process between the low speed mode and a 2nd mode.
Figure 13:
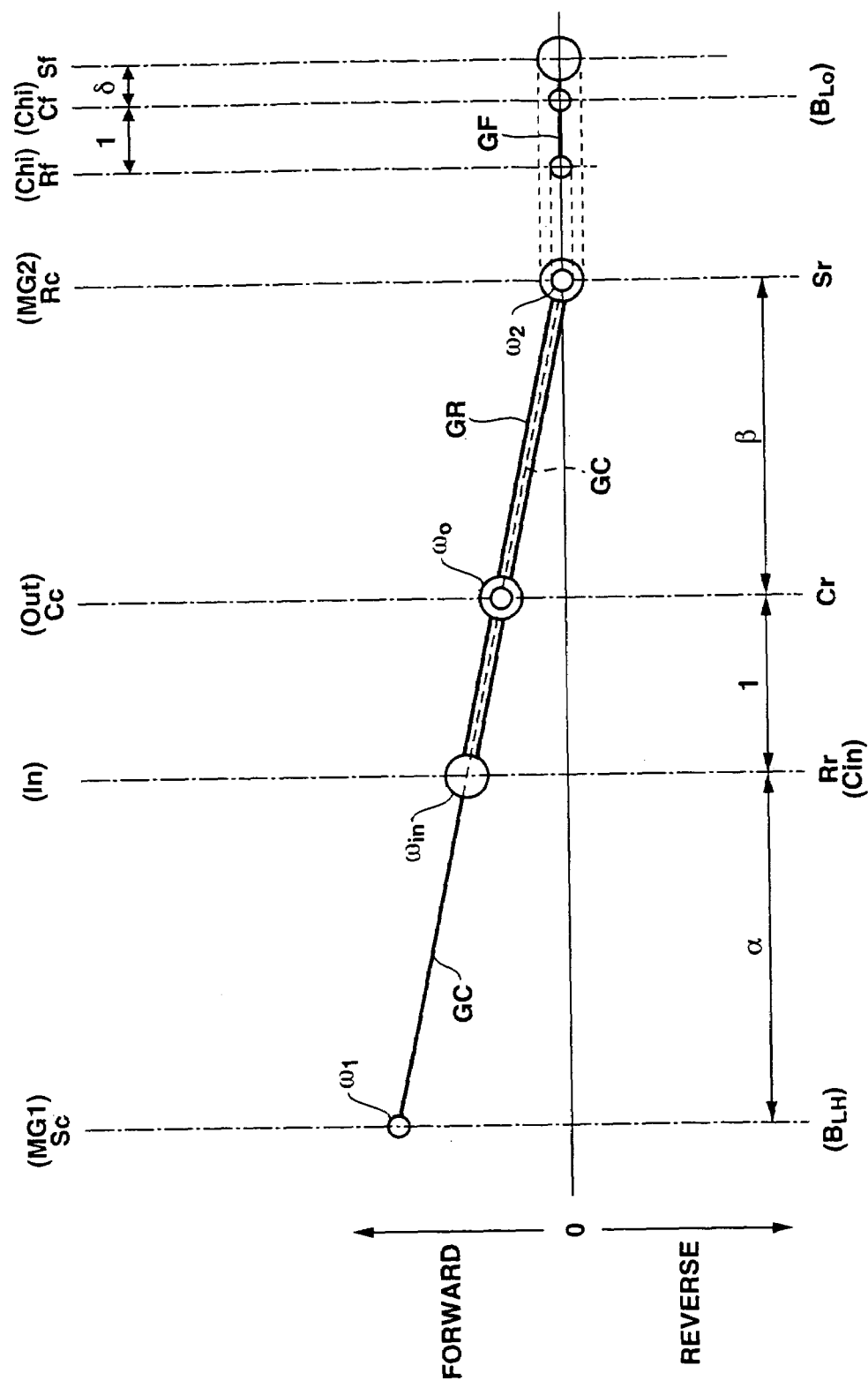
FIG. 13 is a lever diagram depicting an operating state of the hybrid transmission of FIG. 1 in the 2nd mode.

FIG. 13 shows a 2nd mode of hybrid transmission 1. The transmission mode is shifted from the low speed mode to the 2nd mode by engaging high-mode clutch Chi to connect front ring gear Rf and front planet-pinion carrier Cf. FIG. 12 shows an operating state of transition of the transmission mode from the low speed mode to the 2nd mode, in which the magnitudes of the rotational speeds of central ring gear Rc (and front ring gear Rf) and front sun gear Sf (and rear sun gear Sr) are decreasing toward zero with decreasing slippage in high-mode clutch Chi. With high-mode clutch Chi completely engaged, the 2nd mode is established as shown in FIG. 13.

As shown in FIG. 13, in the 2nd mode, the rotational speeds of rear sun gear Sr and central ring gear Rc are zero. Accordingly, lever GR and lever GC overlap one another with the right points fixed to zero point, so that hybrid transmission 1 has one degree of freedom. Thus, the gear ratio is fixed at a gear ratio. In the fixed gear ratio, the vehicle travels by the driving torque which is generated by engine ENG and/or first motor/generator MG1. In the second mode, with low-mode brake $B_{LO}$ engaged and high-mode clutch Chi engaged, hybrid transmission 1 is operated to establish a fixed gear ratio with one degree of freedom. More specifically, in this 2nd mode, hybrid controller 21 controls first motor/generator MG1, and engine ENG, to establish the fixed gear ratio of input speed $\omega_{in}$ to output speed $\omega_o$.

Figure 14:
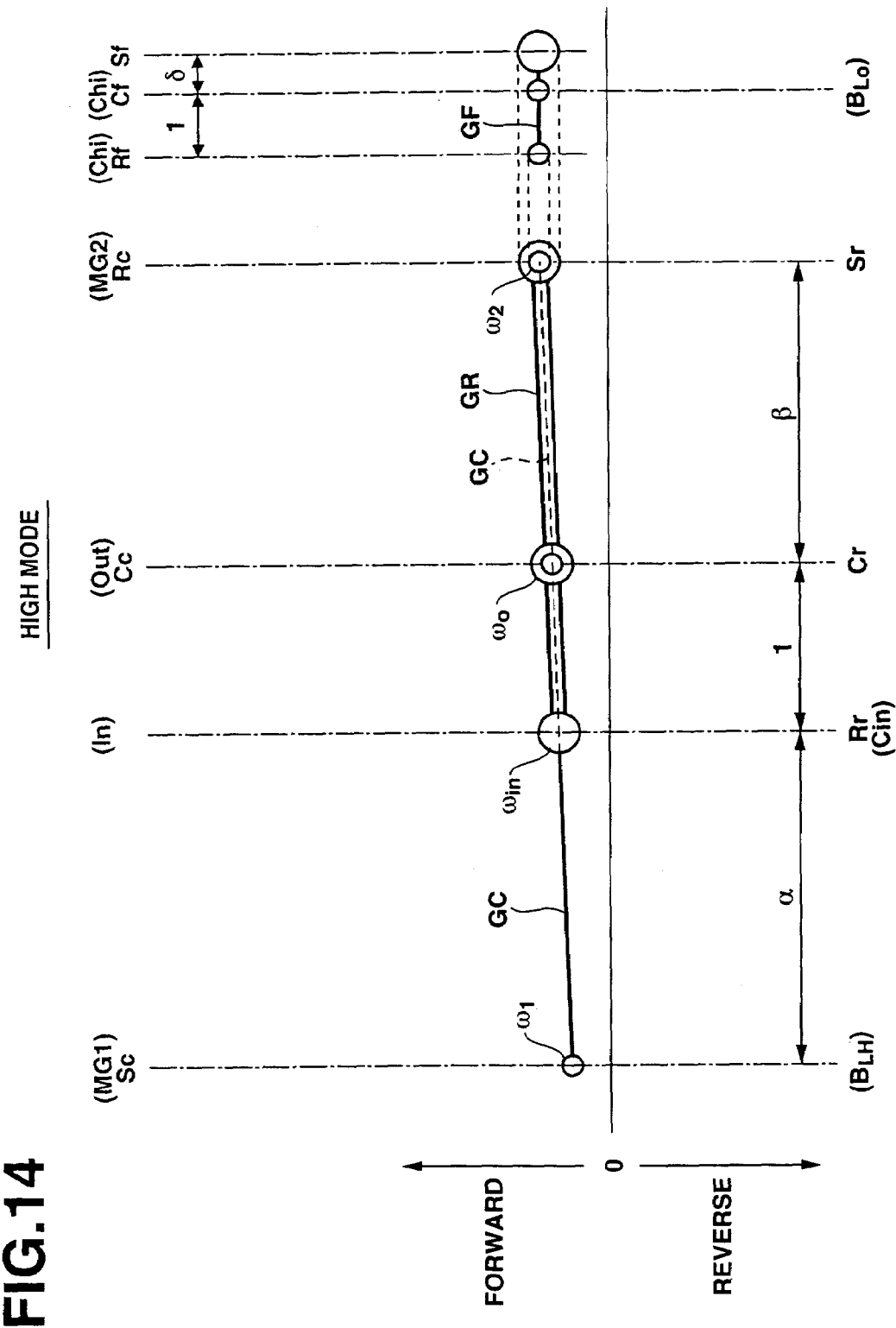
FIG. 14 is a lever diagram depicting an operating state of the hybrid transmission of FIG. 1 in a high speed mode.

FIG. 14 shows a high speed mode of hybrid transmission 1. In the high speed mode, high-mode clutch Chi is engaged to connect front planet-pinion carrier Cf and front ring gear Rf. With low-mode brake $B_{LO}$ disengaged, the three rotating elements of front planetary gearset GF rotate integrally at a same rotational speed. As shown in FIG. 14, lever GF moves up and down, held in the horizontal position. Lever GR and lever GC overlap each other, to be a single lever including four rotating elements with two degrees of freedom.

In the high speed mode, with high-mode clutch Chi engaged, hybrid transmission 1 is controlled with two degrees of freedom, to establish an infinitely variable gear ratio. More specifically, in the high speed mode, hybrid controller 21 controls first motor/generator MG1, second motor/generator MG2, and engine ENG, with two degrees of freedom, to provide an arbitrary gear ratio of input speed $\omega_{in}$ to output speed $\omega_o$, and an arbitrary output torque. As seen in FIG. 14, in the high speed mode, output speed $\omega_o$ of output Out connected to rear planet-pinion carrier Cr at the central point of lever GR (central planet-pinion carrier Cc) is higher than input speed $\omega_{in}$ of input In connected to rear ring gear Rr at the left point of lever GR, that is, than the engine speed input via engine clutch Cin. This high speed mode is employed, when an infinitely variable high speed ratio is desired.

Alternatively, in the high speed mode, low/high-mode brake $B_{LH}$ may be engaged to hold against rotation central ring gear Rc, so that the gear ratio is fixed to a gear ratio. In this fixed gear ratio, hybrid transmission 1 employs only the torque of engine ENG, so that the vehicle travels at a high speed. Second motor/generator MG2 may be operated as a motor to boost the driving torque, or as a generator to charge battery 25 during deceleration of the vehicle. Accordingly, the drivability and the fuel economy are compatible in a high speed driving condition. Thus, with high-mode clutch Chi engaged and low/high-mode brake $B_{LH}$ engaged, hybrid transmission 1 is operated to establish a fixed gear ratio with one degree of freedom. More specifically, in this high speed mode, hybrid controller 21 controls second motor/generator MG2, and engine ENG, to establish the fixed gear ratio of input speed $\omega_{in}$ to output speed $\omega_o$.

In this embodiment, the mode switch control system controls the mode switch from the high speed mode in which only high-mode clutch Chi is engaged to connect front ring gear Rf and front planet-pinion carrier Cf to establish an infinitely variable high gear ratio as shown in FIG. 14, to the low speed mode in which only low-mode brake $B_{LO}$ is engaged to hold against rotation front planet-pinion carrier Cf to establish an infinitely variable low gear ratio as shown in FIG. 11. This control process is executed as follows. First, low-mode brake $B_{LO}$ is engaged to shift the transmission state from the high speed mode as shown in FIG. 14 to the 2nd mode as shown in FIG. 13. Next, high-mode clutch Chi is disengaged to shift the transmission state from the 2nd mode to the low speed mode as shown in FIG. 11. In parallel with these engagement processes, motor/generator torque Tmg2 is controlled.

As in the previous embodiments as shown in FIG. 1, the change of motor/generator torque Tmg2 includes a discontinuity at mode-switch gear ratio i0. More specifically, motor/generator torque Tmg2 changes from a positive value in the high speed mode to a negative value in the low speed mode, during the process of the mode switch operation. In other words, the operating state of motor/generator torque Tmg2 is changed with a polarity reversal, during the process of the mode switch operation. Accordingly, this torque gap, causes a shift shock, if the transmission mode is instantaneously switched between the high speed mode and the low speed mode.

To solve the above-mentioned problems, the mode switch control system controls the hybrid transmission of FIG. 10, in accordance with the process of the mode switch control as shown in FIGS. 6 through 8, to produce similar effects as in the previous embodiments.

This application is based on a prior Japanese Patent Application No. 2004-36079 filed on Feb. 13, 2004. The entire contents of this Japanese Patent Application No. 2004-36079 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A mode switch control system for a hybrid transmission for a powertrain, the powertrain including an engine, a motor/generator, and an output shaft, the hybrid transmission including a stationary rotating element, and a differential unit including a plurality of rotating elements to connect the engine, the motor/generator, and the output shaft to each other, the mode switch control system comprising:

a first torque-transmitting mechanism selectively engageable to connect specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable to disconnect the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio;

an actuator to adjust a torque capacity of the first torque-transmitting mechanism;

a motor/generator controller to adjust a torque of the motor/generator; and a control unit in operative communication with the actuator and the motor/generator controller, to perform the following:

determining an operating condition of the hybrid transmission;

issuing a command indicative of switching the transmission mode from the high speed mode to the low speed mode, in accordance with the operating condition of the hybrid transmission; and performing the following, in response to the command:

reducing the torque capacity of the first torque-transmitting mechanism, to disengage the first torque-transmitting mechanism; and varying the torque of the motor/generator to the second torque, in connection with the reduction of the torque capacity of the first torque-transmitting mechanism.

2. The mode switch control system as claimed in claim 1, for the hybrid transmission further including a first motor/generator connected to specific one of the rotating members, wherein the motor/generator controller is configured to adjust a torque of the first motor/generator, the control unit is configured to perform the following, in response to the command:

holding constant an input torque from the engine;

controlling the torque of the first motor/generator so that the output torque varies in accordance with a target output torque.

3. The mode switch control system as claimed in claim 1, wherein the control unit is configured to perform the following, in response to the command:

reducing the torque capacity of the first torque-transmitting mechanism linearly in time, to reduce the torque capacity of the first torque-transmitting mechanism; and varying the torque of the motor/generator linearly in time, to vary the torque of the motor/generator to the second torque.

4. The mode switch control system as claimed in claim 3, wherein the control unit is configured to perform the following, in response to the command:

controlling the torque capacity of the first torque-transmitting mechanism to a value smaller than a value to serve for the torque balance, to promote a change in an operating state of the hybrid transmission.

5. The mode switch control system as claimed in claim 1, wherein the control unit is configured to perform the following, in response to the command:

controlling the torque capacity of the first torque-transmitting mechanism by an open-loop control system, to reduce the torque capacity of the first torque-transmitting mechanism; and controlling the torque of the motor/generator by a feedback control system so that a specific state variable varies in accordance with a target value, to vary the torque of the motor/generator to the second torque.

6. The mode switch control system as claimed in claim 5, further comprising a sensing section to measure rotational speeds of the rotating elements, wherein the state variable is the speed ratio, and the control unit, in operative communication with the sensing section, is configured to perform the following, in response to the command:

determining the input speed, and the output speed; and determining an actual speed ratio, in accordance with the input speed, and the output speed; and controlling the torque of the motor/generator by the feedback control system so that the actual speed ratio varies in accordance with a target speed ratio, to vary the torque of the motor/generator to the second torque.

7. The mode switch control system as claimed in claim 1, wherein the control unit is configured to perform the following, in response to the command:

controlling the torque of the motor/generator by an open-loop control system, to vary the torque of the motor/generator to the second torque; and controlling the torque capacity of the first torque-transmitting mechanism by a feedback control system so that a specific state variable varies in accordance with a target value, to reduce the torque capacity of the first torque-transmitting mechanism.

8. The mode switch control system as claimed in claim 7, further comprising a sensing section to measure rotational speeds of the rotating elements, wherein a state variable is the speed ratio, and the control unit, in operative communication with the sensing section, is configured to perform the following, in response to the command:

determining an input speed from the engine, and an output speed to the output shaft; and determining an actual speed ratio, in accordance with the input speed, and the output speed; and controlling the torque capacity of the first torque-transmitting mechanism by the feedback control system so that the actual speed ratio varies in accordance with a target speed ratio, to reduce the torque capacity of the first torque-transmitting mechanism.

9. The mode switch control system as claimed in claim 1, further comprising a second torque-transmitting mechanism selectively engageable to connect other specific two of the rotating elements to establish the low speed mode, and disengageable to disconnect the other specific two rotating elements to establish the high speed mode, wherein the actuator is configured to adjust a torque capacity of the second torque-transmitting mechanism, and the control unit is configured to perform the following, in response to the command:

increasing the torque capacity of the second torque-transmitting mechanism, in connection with the reduction of the torque capacity of the first torque-transmitting mechanism.

10. The mode switch control system as claimed in claim 9, wherein the control unit is configured to perform the following, in response to the command:

increasing the torque capacity of the second torque-transmitting mechanism linearly in time, to increase the torque capacity of the second torque-transmitting mechanism.

11. The mode switch control system as claimed in claim 10, wherein the control unit is configured to perform the following, in response to the command:

controlling the torque capacity of the second torque-transmitting mechanism to a value greater than a value to serve for the torque balance.

12. The mode switch control system as claimed in claim 9, further comprising a one-way clutch in parallel with the second torque-transmitting mechanism, to establish the low speed mode, wherein the actuator is configured to adjust the torque capacity of the second torque-transmitting mechanism, and the control unit is configured to perform the following, in response to the command:

engaging the second torque-transmitting mechanism, at a time point after the one-way clutch initiating to provide torque transmission.

13. The mode switch control system as claimed in claim 1, wherein the control unit is configured to perform the following, in response to the command:

initiating the variation of the torque of the motor/generator, at a time point when the speed ratio is near the mode-switch speed ratio; and completing the variation of the torque of the motor/generator, at a time point when the speed ratio is lower than the mode-switch speed ratio.

14. A mode switch control system for a hybrid transmission for a powertrain, the powertrain including an engine, a motor/generator, and an output shaft, the hybrid transmission including a stationary rotating element, and a differential unit including a plurality of rotating elements to connect the engine, the motor/generator, and the output shaft to each other, the mode switch control system comprising:

first torque-transmitting means selectively engageable for connecting specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable for disconnecting the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio;

actuating means for adjusting a torque capacity of the first torque-transmitting means;

motor/generator controlling means for adjusting a torque of the motor/generator; and control means in operative communication with the actuating means and the motor/generator controlling means, for performing the following:
  determining an operating condition of the hybrid transmission;
  issuing a command indicative of switching the transmission mode from the high speed mode to the low speed mode, in accordance with the operating condition of the hybrid transmission; and
  performing the following, in response to the command:
    reducing the torque capacity of the first torque-transmitting means, to disengage the first torque-transmitting means; and
    varying the torque of the motor/generator to the second torque, in connection with the reduction of the torque capacity of the first torque-transmitting means.

15. A method of controlling a hybrid transmission for a powertrain, the powertrain including an engine, a motor/generator, and an output shaft, the hybrid transmission including a stationary rotating element, a differential unit including a plurality of rotating elements to connect the engine, the motor/generator, and the output shaft to each other, and a first torque-transmitting mechanism selectively engageable to connect specific two of the rotating elements to establish a high speed mode to set a speed ratio of an output speed to the output shaft to an input speed from the engine to an infinitely variable high speed ratio in which a torque of the motor/generator is needed to be a first torque to serve for torque balance in the hybrid transmission near a mode-switch speed ratio which is a boundary point between the high speed mode and a low speed mode, and disengageable to disconnect the specific two rotating elements to establish the low speed mode to set the speed ratio to an infinitely variable low speed ratio in which the torque of the motor/generator is needed to be a second torque opposite in direction to the first torque, to serve for the torque balance near the mode-switch speed ratio, the method comprising:
  determining an operating condition of the hybrid transmission;
  issuing a command indicative of switching the transmission mode from the high speed mode to the low speed mode, in accordance with the operating condition of the hybrid transmission; and
  performing the following, in response to the command:
    reducing the torque capacity of the first torque-transmitting mechanism, to disengage the first torque-transmitting mechanism; and
    varying the torque of the motor/generator to the second torque, in connection with the reduction of the torque capacity of the first torque-transmitting mechanism.

* * * * *